US007711113B2

(12) United States Patent (10) Patent No.: US 7,711,113 B2
Takahashi (45) Date of Patent: May 4, 2010

(54) ID-BASED SIGNATURE, ENCRYPTION SYSTEM AND ENCRYPTION METHOD

(75) Inventor: Masashi Takahashi, Funabashi (JP)

(73) Assignee: Hitachi, Ltd., Tokyo (JP)

( * ) Notice: Subject to any disclaimer, the term of this patent is extended or adjusted under 35 U.S.C. 154(b) by 1281 days.

(21) Appl. No.: 11/048,863

(22) Filed: Feb. 3, 2005

(65) Prior Publication Data

US 2006/0126832 A1 Jun. 15, 2006

(30) Foreign Application Priority Data

Dec. 9, 2004 (JP) ............................ 2004-356948

(51) Int. Cl.
*H04K 1/00* (2006.01)
(52) U.S. Cl. ..................................... 380/30
(58) Field of Classification Search ................ 380/30
See application file for complete search history.

(56) References Cited

U.S. PATENT DOCUMENTS 6,986,044 B1 * 1/2006 Inada .......................... 713/170
7,113,594 B2 * 9/2006 Boneh et al. ................. 380/28

OTHER PUBLICATIONS

"Identity Based Encryption from the Weil Pairing", by D. Boneh and M. Franklin, SIAM J. of Computing, vol. 32, No. 3, pp. 586-615, 2003, Extended abstract in proceedings of Crypto '2001, Lecture Notes in Computer Science, vol. 2139, Springer-Verlag, pp. 213-229, 2001, Full paper: PDF.
Florian Hess, Efficient Identity Based Signature Schemes based on Pairings, In K. Nyberg and H. Heys, editors, Proceedings of SAC 2002, LNCS 2595, pp. 310-324, St. Johns, Newfoundland, 2003.
Liqun Chen and John Malone-Lee, "Improved Identity-Based Signcryption", 2004.

* cited by examiner

*Primary Examiner*—Jacob Lipman
(74) *Attorney, Agent, or Firm*—Antonelli, Terry, Stout & Kraus, LLP.

(57) ABSTRACT

An ID-based encryption and signature technique, according to which more efficient and higher speed processing is possible. In generation of public parameters, an element P of a group $G_1$ of order q is selected, and then, $g=e(P, P)$ calculated in advance is added to the public parameters. At the time of encryption and verification, a public key ID is associated with an element $P_{ID}$ of the group $G_1$, using $u \in Z_q^*$ and two elements $P_1$ and $P_2$ (included in the public parameters) of $G_1$ and calculating $P_{ID}=P_1+uP_2$. The above-mentioned elements $P_1$ and $P_2$ are determined by $P_1=s_1 P$ and $P_2=s_2 P$ using random numbers $s_1, s_2 \in Z_q^*$ as a part of a master key, and a private key of a user is determined by $d_{ID}=(s_1+us_2)^{-1}P$.

9 Claims, 15 Drawing Sheets

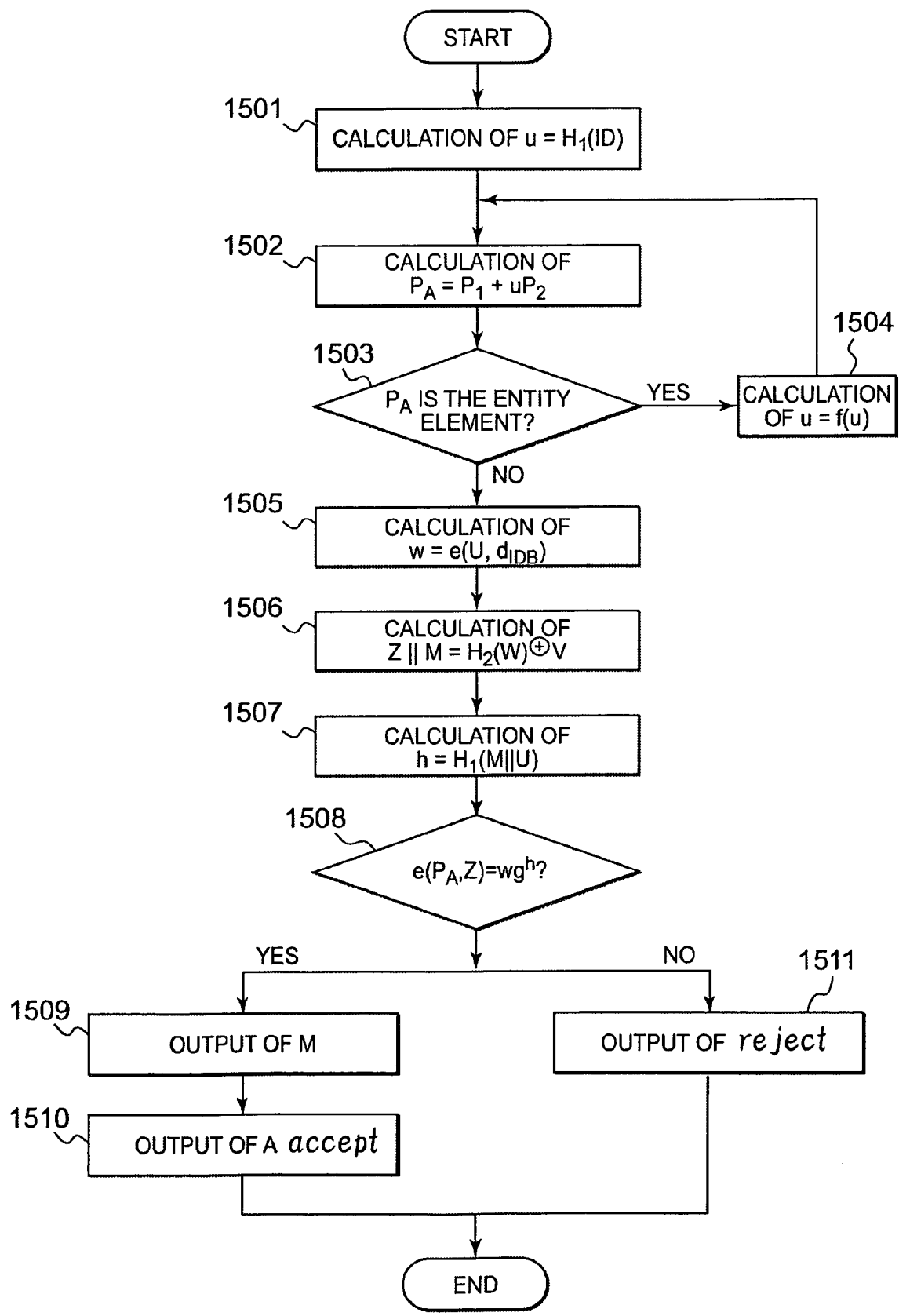

ID-BASED SIGNATURE, ENCRYPTION SYSTEM AND ENCRYPTION METHOD

BACKGROUND OF THE INVENTION

The present invention relates to a cryptographic technique as an information security technique, and in particular, to ID-based encryption and signature technique that can use any character string as a public key.

ID-based encryption, digital signature and Signcryption systems can use any character string as a public key. Signcryption performs encryption and signing (authentication) at the same time. These are realized using a property (called pairing) of a bilinear mapping (See, for example, Identity based encryption from the Weil pairing, by D. Boneh and M. Franklin, SIAM J. of Computing, Vol. 32, No. 3, pp. 586-615, 2003, Extended abstract in proceedings of Crypto '2001, Lecture Notes in Computer Science, Vol. 2139, Springer-Verlag, pp. 213-229, 2001, Full paper: PDF. (http://crypto.stanford.edu/~dabo/pubs.html) (hereinafter, referred to as Non-patent Document 1), F. Hess, Efficient Identity based Signature Schemes based on Pairings, In K. Nyberg and H. Heys, editors, Proceedings of SAC 2002, LNCS 2595, pp. 310-324, St. Johns, Newfoundland, 2003. (http://www-.math.tu-berlin.de/~hess/) (hereinafter, referred to as Non-patent Document 2) and Liqun Chen and John Malone-Lee, Improved Identity-Based Signcryption (http://eprint.iacr.org/2004/114/) (hereinafter, referred to as Non-patent Document 3).

Assuming two groups $G_1$ and $G_2$ of order q, pairing means a mapping bilinear e from $G_1 \times G_1$ to $G_2$ that satisfies the following properties:

1. For any P, $Q \in G_1$, e satisfies $e(aP, bQ) = e(P, Q)^{ab}$.

2. For any P, $Q \in G_1 \times G_1$, e satisfies $e(P, Q) \neq$ the identity in $G_2$.

For any P, $Q \in G_1$, there is known an efficient algorithm for calculating e(P, Q). As specific pairing, Weil pairing and Tate pairing defined on an elliptic curve on a finite field are known.

In the following, will be described encryption, digital signature and Signcryption using an ID-based system, i.e., an ID-based public key encryption system, an ID-based digital signature system, and the ID-based Signcryption.

First, will be described an ID-based public key encryption system disclosed in Non-patent Document 1.

A system that realizes the ID-based public key encryption system comprises a private key generation center instead of a certification authority that authenticates a public key. The private key generation center determines public parameters that are used in common in the system. And, for any ID (for example, an E-mail address) that each user selects as a public key, the private key generation center generates a private key for that public key, using a master key that the private key generation center keeps under strict surveillance so that the master key should not be leaked out, and delivers the generated private key to the user concerned. The private key generation center administers the ID (public key) selected by a user and the generated private key, associating the ID with the private key. A method of selecting a public key has been determined as rules in the system.

The ID-based public key encryption system comprises the following four processes. The processes (1) and (2) are performed in the private key generation center, the process (3) on the sender's side, and the process (4) on the receiver's side.

(1) Setup: Public parameters including groups and pairing used commonly in the system are generated. Further, a master key is generated. The public parameters are opened to the public. To ensure security of the entire system, the master key is kept under strict surveillance so that the master key should not be leaked to the outside including users of the system.

(2) Extract: For each user, a private key of that user is generated applying the master key to a character string that can be associated with the user (such as an E-mail address of the user). On the other hand, the character string becomes a public key of the user.

(3) Encrypt: Using the public parameters and a public key of a sending destination, encryption object data are encrypted.

(4) Decrypt: Using the public parameters and a private key of the recipient, the encrypted data are decrypted.

Next, will be described input, output and processing in each of the above processes (1)-(4).

In the following, $Z^+$ means a set of the positive integers, $Z_q$ a set of positive integers less than q, and $Z_q^*$ a set of positive integers less than q, which is relatively prime with $Z_q$. Further, $\{0, 1\}^*$ means all the binary sequences. An expression XOR means exclusive disjunction (exclusive-OR). Further, $\|$ means join. In the drawings, exclusive-OR is indicated by a circle cross symbol.

(1) Setup:

Input: security parameter $k \in Z^+$

Output: the public parameters params and the master key s

Procedure:

1. Generation of a k bit prime number q

2. Selection of a group $G_1$ of order q

3. Selection of a group $G_2$ of order q

4. Selection of a pairing e: $G_1 \times G_1 \rightarrow G_2$

5. Selection of a generator P of $G_1$

6. Random selection of an element s of $Z_q^*$ ($s \in Z_q^*$), to define $P_{pub} = sP$ 7. Selection of a hash function $H_1: \{0, 1\}^* \rightarrow G_1^*$ 8. Selection of a hash function $H_2: G_2 \rightarrow \{0, 1\}^n$ for some integer n 9. Output of the public parameters params=<q, $G_1$, $G_2$, e, n, P, $P_{pub}$, $H_1$, $H_2$>

10. Output of the master key s (2) Extract:

Input: the public parameters params, the master key s, and any character string ID used as a public key Output: a private key $d_{ID}$ corresponding to ID Procedure:

1. Calculation of the hash function $Q_{ID} = H_1(ID)$ of ID, for the given ID (ID$\in \{0, 1\}^*$) included in the set of all the binary sequences 2. Calculation of the private key $d_{ID}$ corresponding to ID, using the master key s and the hash value of ID (calculation of $d_{ID} = sQ_{ID}$)

3. Output of the private key $d_{ID}$ (3) Encrypt:

Input: encryption object data M, the public parameters params and the public key ID Output: encrypted data $C = (C_1, C_2)$ Procedure:

1. Calculation of $Q_{ID} = H_1(ID) \in G_1^*$

2. Random selection of $r \in Z_q^*$

3. Calculation of $C_1 = rP$

4. Calculation of $g_{ID} = e(Q_{ID}, P_{pub})$

5. Calculation of $h = H_2(g_{ID}^r)$

6. Calculation of $C_2 = M$ XOR $h$

7. Output of encrypted data $(C_1, C_2)$ (4) Decrypt:

Input: the encrypted data $(C_1, C_2)$, the public parameters params and the private key $d_{ID}$ Output: decrypted data M Procedure:

1. Calculation of $g = e(d_{ID}, C_1)$

2. Calculation of $h = H_2(g)$

3. Calculation of $M = C_2$ XOR $h$

4. Output of decrypted data M

Next, will be described an ID-based digital signature system disclosed in Non-patent Document 2.

Fundamentally, the system for realizing an ID-based digital signature is similar to the above-described ID-based public key encryption system. For any character string ID (for example, an E-mail address) that each user selects as a public key, a private key generation center generates a secret key corresponding to that public key and delivers the generated private key to the user concerned. A user on the sender side uses his private key to make his signature. Receiving a massage added with the signature, a user on the receiver side verifies the signature using the public key.

The ID-based digital signature system comprises the following four processes. The processes (1) and (2) are performed in the key generation center, the process (3) on the sender's side, and the process (4) on the receiver's side.

(1) Setup: Public parameters including groups and pairing used commonly in the system are generated. Further, a master key is generated. The public parameters are opened to the public. To ensure security of the entire system, the master key is kept under strict surveillance so that the master key should not be leaked to the outside including users of the system.

(2) Extract: For each user, a private key of that user is generated applying the master key to a character string that can be associated with the user (such as an E-mail address of the user). On the other hand, the character string becomes a public key of that user.

(3) Sign: Using the public parameters and a private key of a signer, his signature is generated.

(4) Verify: Signature verification is performed using the public parameters and a public key of the sender.

Next, will be described input, output and processing specifications in each of the above processes (1)-(4).

(1) Setup:

Input: security parameter $k \in Z^+$

Output: the public parameters params and the master key s

Procedure:

1. Generation of a k bit prime number q

2. Selection of a group $G_1$ of order q

3. Selection of a group $G_2$ of order q

4. Selection of a pairing $e: G_1 \times G_1 \rightarrow G_2$

5. Selection of a generator P of $G_1$

6. Random selection of $s \in Z_q$, to define $P_{pub} = sP$

7. Selection of a hash function $H_1: \{0, 1\}^* \rightarrow G_1^*$

8. Selection of a hash function $H_2: \{0, 1\}^* \rightarrow Z_q$

9. Output of the public parameters params=$<q, G_1, G_2, e, P, P_{pub}, H_1, H_2>$ 10. Output of the master key s (2) Extract:

Input: the public parameters params, the master key s, any character string ID used as a public key Output: a private key $d_{ID}$ corresponding to ID Procedure:

1. Calculation of $Q_{ID} = H_1(ID)$

2. Calculation of $d_{ID} = sQ_{ID}$

3. Output of the private key $d_{ID}$ (3) Sign:

Input: signature object data M, the public parameters params and the private key $d_{ID}$ of the signer Output: a signature (u, v)

Procedure:

1. Random selection of $k \in Z_q^*$

2. Random selection of $P_1 \in G_1^*$

3. Calculation of $r = e(P_1, P)^k$

4. Calculation of $v = H_2(M, r)$

5. Calculation of $u = vd_{ID} + kP_1$

6. Output of the signature (u, v)

(4) Verify:

Input: the signature (u, v), the signature object data M, the public parameter params and the public key ID of the signer Output: accept or reject Procedure:

1. Calculation of $Q_{ID} = H_1(ID) \in G_1^*$

2. Calculation of $r = e(u, P) \times e(Q_{ID}, -P_{pub})$

3. Output of accept if $v = H_2(M, r)$ is satisfied, or reject if not

Next, will be described ID-based Signcryption disclosed in Non-patent Document 3. Fundamentally, the system for realizing the ID-based Signcryption is similar to the above-described ID-based public key encryption system and the ID-based digital signature system.

The ID-based Signcryption comprises the following six processes. The processes (1) and (2) are performed in a private key generation center, the processes (3) and (4) on the sender's side, and the processes (5) and (6) on the receiver's side.

(1) Setup: Public parameters including groups and pairing used commonly in the system are generated. Further, a master key is generated. The public parameters are opened to the public. To ensure security of the entire system, the master key is kept under strict surveillance so that the master key should not be leaked to the outside including users of the system.

(2) Extract: A private key of a user is generated applying the master key to a character string that can be associated with that user (such as an E-mail address of the user). The character string becomes a public key of that user.

(3) Sign: Using the public parameters and a private key of a signer, his signature is generated.

(4) Encrypt: Using the public parameters and a public key of a sending destination, encryption object data added with the signature are encrypted. Or, the signature is added to encrypted data.

(5) Decrypt: Using the public parameters and a private key of the recipient, the encrypted data are decrypted and the signature is extracted. Or, after extraction of the signature, the encrypted data are decrypted.

(6) Verify: Using the public parameters and the public key of the sender, the signature is verified.

Next, will be described input, output and processing specifications in each of the above processes (1)-(6).

(1) Setup: Generation of the Public Parameters and the Master Key

Input: security parameter $k \in Z^+$

Output: the public parameters params and the master key s

Procedure:

1. Generation of a k bit prime number q
2. Selection of a group $G_1$ of order q
3. Selection of a group $G_2$ of order q
4. Selection of a pairing e: $G_1 \times G_1 \to G_2$
5. Selection of a generator P of $G_1$
6. Random selection of $s \in Z_q^*$, to define $P_{pub}=sP$
7. Selection of a hash function $H_0$: $\{0, 1\}^* \to G_1^*$
8. Selection of a hash function $H_1$: $\{0, 1\}^* \to Z_q^*$
9. Selection of a hash function $H_2$: $G_2 \to \{0, 1\}^*$
10. Output of the public parameters params=<q, $G_1$, $G_2$, e, P, $P_{pub}$, $H_0$, $H_1$, $H_2$>
11. Output of the master key s (2) Extract:

Input: the public parameters params, the master key s, and any character string ID used as a public key Output: a private key $d_{ID}$ corresponding to ID Procedure 1. Calculation of $Q_{ID}=H_0(ID) \in G_1^*$
2. Calculation and output of the secret key $d_{ID}=sQ_{ID}$ (3) Sign and (4) Encrypt (Signature Generation and Encryption)

Input: signature object data M, the public parameters params and a private key $d_{ID}$ of a signer Output: a signature (u, v)

Sign Procedure:

1. Calculation of $Q_A=H_0(ID_A)$
2. Random selection of $r \in Z_q^*$
3. Calculation of $X=rQ_A$
4. Calculation of $h=H_1(M\|X)$, where M is the data as the object of signature and encryption
5. Calculation of $Z=(r+h)d_{IDA}$
6. Sending of the signature (X, Z) together with (M, r, $ID_A$, $d_{IDA}$) to Encrypt Encrypt Procedure:

1. Calculation of $Q_B=H_0(ID_B) \in G_1^*$
2. Calculation of $w=e(rd_{IDA}, Q_B)$
3. Calculation of $Y=H_2(w)$ XOR $(Z\|ID_A\|M)$
4. Output of C=(X, Y) as cipher text added with the signature
   (5) Decrypt and (6). Verify (Decryption+Signature Verification)

Input: the cipher text with the signature (X, Y), the public parameters params, and the public key ID of the signer Output: accept or reject Decrypt Procedure:

1. Calculation of $w=e(X, d_{IDB})$
2. Calculation of $Z\|ID_A\|M=H_2(w)$ XOR Y
3. Sending of $(ID_A, M)$ and (X, Z) to Verify Verify Procedure:

4. Calculation of $Q_A=H_0(ID_A)$
5. Calculation of $h=H_1(M\|X)$
6. Verification of $e(Z, P)=e(P_{pub}, hQ_A)$, and output of accept if $e(Z, P)=e(P_{pub}, hQ_A)$ is satisfied, or reject if not

SUMMARY OF THE INVENTION

Each of the above-described ID-based systems, in which pairing is used, essentially requires an arithmetic unit that performs pairing operation. However, it is known that pairing operation becomes a heavy load. Thus, to have a higher processing speed in these systems, pairing operation should be performed at a higher speed. However, it is difficult to realize this.

Further, in addition to the problem that pairing becomes a heavy load, there is another problem that degree of freedom is low in selecting an elliptic curve.

At present, known usable pairings are only Weil paring and Tate pairing each defined on an elliptic curve on a finite field. In a system using such pairing, it is necessary to prepare a hash function that associates any character string as a public key with a point on a group (i.e., a point on an elliptic curve on a finite field).

Based on Non-patent Document 1, will be described an example of preparation of a hash function $H_1$: $\{0, 1\}^* \to G_1^*$ in the case where Weil or Tate pairing on an elliptic curve is used.

Here, it is assumed that p is a prime number satisfying p=2 mod 3 and p=lq−1 for q satisfying q>3, and q does not divide into l. Further, it is assumed that E is an elliptic curve $y^2=x^3+1$ defined on a finite field $F_p$, and $E(F_p)$ is a group consisting of the points on E. Further, it is assumed that $G_1$ is a subgroup of $E(F_p)$ and order of $G_1$ is q. Then, $H_0$: $\{0, 1\}^* \to G_1$ is prepared assuming that a hash function $H_1'$: $\{0, 1\}^* \to F_p$ exists.

Input: ID$\in \{0, 1\}^*$

Output: $Q_{ID} \in G_1$

Procedure:

1. Calculation of $y_0=H_1'(ID)$
2. Calculation of $x_0=(y_0^2-1)^{1/3}=(y_0^2-1)^{(2p-1)/3} \in F_p$ 3. Letting $Q=(x_0, y_0) \in (F_p)$ 4. Calculation of $Q_{ID}=lQ \in G_1$ 5. Output of $Q_{ID}$ A hash function is prepared in order to associate any character string as a public key to a point on an elliptic curve and thus depends on the structure of the elliptic curve. In the case of the conventional systems, when an elliptic curve to use is changed, selection of a hash function should be changed, which becomes a restriction on selection of an elliptic curve.

The present invention has been made taking the above problem into consideration, and the present invention improves a processing speed and degree of freedom of selecting an elliptic curve to use, in the case where an ID-based system is employed.

The present invention reduces a number of times of using paring operation for realizing each ID-based system.

In detail, the present provides an ID-based signature and encryption system that can use any character string as a public key, wherein:

the ID-based signature and encryption system comprises:

a private key generation apparatus, which generates public parameters and a master key used in the entire system, publishes said public parameters, and uses said master key for generating a private key corresponding to a user's public key in response to a request of a user, to issue the generated secret key to said user as a requester;

an encryption and signature generation apparatus, which performs at least one of a message encryption processing and a signature generation processing, using the public parameters published by the private key generation apparatus, a user's secret that issued by the secret y generation apparatus, and a public key of a recipient; and a decryption and signature verification apparatus, which uses the public parameters published by the private key generation apparatus and the private key issued by the private key generation apparatus and a public key of a sender, to perform at least one of a decryption processing and a signature verification processing on a message that has been subjected to at least one of the encryption processing and the signature generation processing by the encryption and signature generation apparatus, depending on the processing to which said message has been subjected; and the private key generation apparatus:

selects an element P of a group of order q, and adds $g=e(P, P)$ (e is a bilinear mapping called a pairing) calculated in advance to said public parameters;

defines two elements $P_1$ and $P_2$ of the above-mentioned group as $P_1=s_1P$ and $P_2=s_2P$, using random numbers $s_1$ and $s_2$ as a part of said master key, with $s_1$ and $s_2$ being included in a set $Z_q^*$ of positive integers less than order q and relatively prime with q, to calculate $(s_1+us_2)^{-1}P$ as the private key; and the encryption and signature generation apparatus and the decryption and signature verification apparatus associate the public key with an element $P_{ID}$ of the above-mentioned group, by calculating $P_{ID}=P_1+uP_2$ using any character string u included in the set $Z_q^*$ and the two elements $P_1$ and $P_2$.

According to the present invention, it is possible to improve a processing speed in using each ID-based system. Further, degree of freedom of selecting an elliptic curve is increased.

BRIEF DESCRIPTION OF THE DRAWINGS

FIG. 15 is a flowchart for explaining decryption and signature verification processing according to the embodiment.

DETAILED DESCRIPTION

Figure 1:
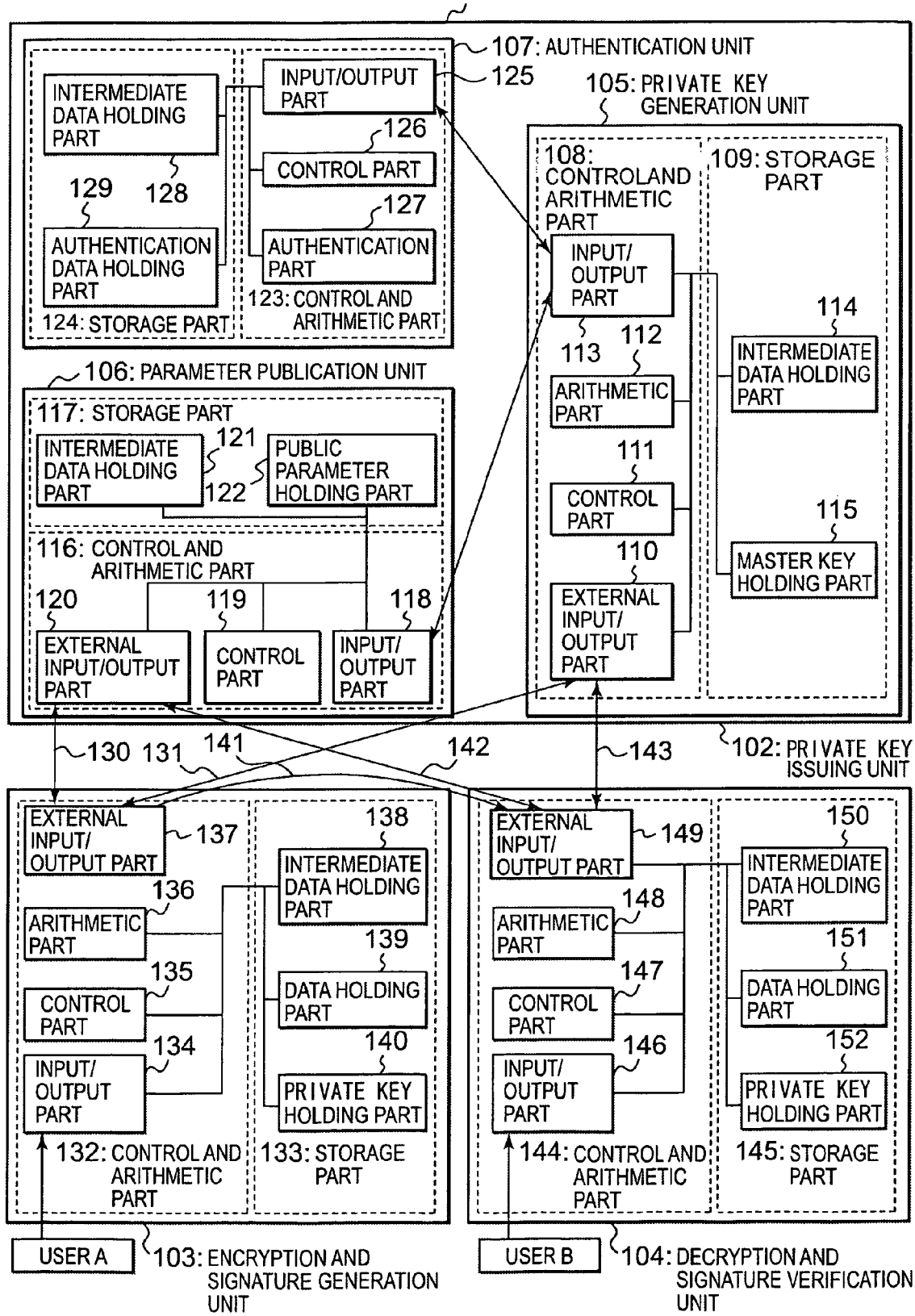
FIG. 1 is a functional block diagram showing an entire configuration of an ID-based encryption and signature system of an embodiment of the present invention.

Now, embodiments of the present invention will be described referring to the drawings.

In an ID-based encryption and signature system according to a present embodiment of the invention, following improvements are made so that pairing is not needed in encryption for realizing each of an ID-based encryption system, a digital signature system and a Signcryption system.

(1) In a step of generating public parameters, an element P of a group $G_1$ of order q is selected, and $g=e(P, P)$ is calculated and included among the public parameters.

(2) In steps of encryption and signature verification, instead of using hash functions to associate a public key ID and an element Q of the group $G_1$, a public key ID is associated with an element $P_{ID}$ of the group $G_1$ using u and two elements $P_1$ and $P_2$ of the group $G_1$ ($P_1$ and $P_2$ are included in the public parameters) and calculating $P_{ID}=P_1+uP_2$. Here, u is a hash value ($u \in Z_q^*$) of the public key ID, and obtained from a hash function included in the public parameters.

(3) Using random numbers $s_1, s_2 \in Z_q^*$, the above $P_1$ and $P_2$ are defined as $P_1=s_1P$ and $P_2=s_2P$, and a private key $d_{ID}$ of a user is determined as $d_{ID}=(s_1+us_2)^{-1}P$.

Namely, a procedure for encryption in the present embodiment becomes as follows.

Encrypt:

Input: encryption object data M, public parameters params, and a public key ID

Output: encrypted data $C=(U, V)$

Procedure:

1. Calculation of $u=H_1(ID)$

2. Calculation of $P_B=P_1+uP_2$

3. Random selection of $r \in Z_q^*$

4. Calculation of $U = rP_B$

5. Calculation of $h = H_2(g^r)$

6. Calculation of $V = M \text{ XOR } h$

7. Output of encrypted data $(U, V)$

In the following, will be described the ID-based encryption and signature system according to the present embodiment. This system realizes the above procedure.

FIG. 1 is a functional block diagram showing an entire configuration of the ID-based encryption and signature system as well as components of the system, according to the present embodiment.

As shown in the figure, the ID-based encryption and signature system 101 of the present embodiment comprises a secret key issuing unit 102, an encryption and signature generation unit 103 and a decryption and signature verification unit 104. The encryption key issuing unit 102, the encryption and signature generation unit 103 and the decryption and signature verification unit 104 are connected with one another through communication lines 130, 131, 141, 142 and 143. Further, a user of the encryption and signature generation unit 103 is referred to as A and a user of the decryption and signature verification unit 104 is referred to as B. When it is not necessary to distinguish them, they are each simply called a user.

Outlines of encryption, signature affixing, decryption and signature verification using these units in the present embodiment will be described. In the present embodiment, it is assumed that an ID (for example, an E-mail address) associated with a user according to a predetermined rule is used as a public key.

First, the secret key issuing unit 102 generates public parameters and a master key, which are used in the entire ID-based encryption and signature system 101, and opens the public parameters to the public.

To send an encrypted message, the encryption and signature generation unit 103 encrypts a message using a public key of a sending destination (i.e., ID of the user B) and the public parameters, and sends the encrypted message. The decryption and signature verification unit 104 requests in advance the private key issuing unit 102 to issue a private key corresponding to its own public key, and uses the private key and the public parameters to decrypt the encrypted message received from the encryption and signature generation unit 103.

When a message added with a signature is to be sent, the encryption and signature generation unit 103 requests in advance the private key issuing unit 102 to issue a private key corresponding to its own public key (ID of the user A), uses the private key and the public parameters to affix a signature to a message, and sends the message affixed with the signature. The decryption and signature verification unit 104 uses the public key of the sender and the public parameters to verify the received message affixed with signature.

When encryption and signature affixing are to be performed, the encryption and signature generation unit 103 uses the public key of the sending destination (i.e., ID of the user B), the public parameters and the secret key (which has been previously issued from the secret key issuing unit 102) corresponding to its own public key, to encrypt and sign a message to sent, and then sends the encrypted and signed message. The decrypt and sign verification unit 104 uses the private key (which has been previously issued from the private key issuing unit 102) corresponding to its own public key, the public parameters and its own public key, to decrypt the encrypted and signed message received from the encryption and signature generation unit 103 and to verify the signature.

In the following, details of each unit will be described.

The private key issuing unit 102 generates and keeps the public parameters and the master key used commonly in the ID-based encryption and signature system 101, uses the master key to generate a secret key, authenticates a user, and opens the public parameters to the public. The private key issuing unit 102 comprises a private key generation unit 105, a parameter publication unit 106, and an authentication unit 107.

The private key generation unit 105 generates the public parameters and the master key, keeps the master key under strict surveillance so that the master key should not be leaked out, and uses the master key to generate a secret key of a user according to a request from that user. The private key generation unit 105 comprises a control and arithmetic part 108 and a storage part 109.

The control and arithmetic part 108 comprises: an external input/output part 110 used for communicating with the outside of the private key issuing unit 102; a control part 111 that controls the private key generation unit 105 as a whole; an arithmetic part 112 that generates public parameters, a master key and private keys; and an input/output part 113 for inputting and outputting from and to the parameter publication unit 106 and the authentication unit 107.

The storage part 109 comprises: an intermediate data holding part 114 for temporarily holding intermediate data required for operation in the arithmetic part 112; and a master key holding part 115 for keeping the master key together with the public parameters.

The parameter publication unit 106 keeps the public parameters generated by the private key generation unit 105, and publishes the public parameters to the encryption and signature generation unit 103 and the decryption and signature verification unit 104. The parameter publication unit 106 comprises a control and arithmetic part 116 and storage part 117.

The control and arithmetic part 116 comprises: an input/output part 118 used for inputting and outputting from and to the private key generation unit 105; a control part 119 that controls the parameter publication unit 106 as a whole; and an external input/output part 120 used for outputting the public parameters to the outside of the private key issuing unit 102.

The storage part 117 comprises: an intermediate data holding part 121 for holding, if necessary, intermediate data generated in the course of processing; and a public parameter holding part 122 for holding the public parameters.

The authentication unit 107 authenticates a user when that user requests issue of a private key. The authentication unit 107 comprises a control and arithmetic part 123 and a storage part 124.

The control and arithmetic part 123 comprises: an input/output part 125 used for communication with the private key generation unit 105; a control part 126 that controls the authentication unit 107 as a whole; and an authentication part 127 that authenticates a user.

The storage part 124 comprises: an intermediate data holding part 128 for holding, if necessary, intermediate data generated in the course of processing; and an authentication data holding part 129 for holding authentication data.

The encryption and signature generation unit 103 encrypts and signs encryption object data, and comprises a control and arithmetic part 132 and a storage part 133.

The control and arithmetic part 132 comprises: an input/output part 134 for receiving a signature, encryption object data, authentication information and the like from the user A;

a control part 135 that controls the encryption and signature generation unit 103 as a whole; an arithmetic part 136 that performs encryption, signature generation, and the like; and an external input/output part 137 for inputting and outputting the public parameters, a private key, encrypted data and signed data from and to the private key issuing unit 102 and the decryption and signature verification unit 104.

The storage part 133 comprises: an intermediate data holding part 138 for holding, if necessary, intermediate data generated in the course of processing; a data holding part 139 for holding data such as the public parameters; and a private key holding part 140 for keeping the private key of the user A, which has been received from the private key issuing unit 102, under strict surveillance.

The decryption and signature verification unit 104 decrypts encrypted data and verifies a signature affixed to received data, and comprises a control and arithmetic part 144 and a storage part 145.

The control and arithmetic part 144 comprises: an input/output part 146 for receiving input of decryption/signature verification object data, authentication information and the like from the user B; a control part 147 that controls the decryption and signature verification unit 104 as a whole; an arithmetic part 148 that performs decryption, signature verification, and the like; and an external input/output part 149 for inputting and outputting the public parameters, a private key, encrypted data and signed data from and to the private key issuing unit 102 and the encryption and signature generation unit 103.

The storage part 145 comprises: an intermediate data holding part 150 for holding, if necessary, intermediate data generated in the course of processing; a data holding part 151 for holding data such as the public parameters; and a private key holding part 152 for keeping the private key of the user B, which has been received from the private key issuing unit 102, under strict surveillance.

Next, will be described operation of each part of the private key issuing unit 102. As described above, the private key issuing unit 102 generates the public parameters and the master key used in the entire ID-based cipher and signature system 101, and opens the generated public parameters to the public. Further, receiving a private key issuing request that requests issue of a private key, the private key issuing unit 102 authenticates a user as a requester, and, if the authentication ends in success, generates a private key of the user in question, and issues the private key to the user as the requester.

In detail, the control part 111 of the private key generation unit 105 makes the arithmetic part 112 generate public parameters and a master key, while temporarily storing intermediate data generated in the course of the processing into the intermediate data holding part 114. Then, the control part 111 stores the generated public parameters and master key into the master key holding part 115. The master key is kept under strict surveillance so that the master key should not be leaked out of the private key generation unit 105. This is performed, for example, by putting restriction on access to the storage location of the master key. The public parameters are sent to the parameter publication unit 106 through the input/output part 113. Processing of generating the public parameters and the master key will be described later referring to FIG. 2.

Receiving the public parameters from the private key generation unit 105, the parameter publication unit 106 stores the received public parameters into the public parameter holding part 122, being controlled by the control part 119, while temporarily holding generated intermediate data in the intermediate data holding part 121.

Next, when a private key issuing request that requests issue of a secret key is received from a user together with user authentication data including an ID of the user, the control part 111 of the private key generation unit 105 holds the received request and data in the intermediate data holding part 114. Then, the control part 111 sends the user authentication data together with an authentication request that requests authentication of the user to the authentication unit 107 through the input/output part 113.

Receiving the authentication request and the user authentication data through the input/output part 125, the control part 126 of the authentication unit 107 makes the authentication part 127 authenticate the user, using the data held in the authentication data holding part 129, while temporarily storing data generated in the course of the processing into the intermediate data holding part 128. An authentication result is returned to the private key generation unit 105 through the input/output part 125.

Next, the control part 111 of the private key generation unit 105 receives the authentication result from the authentication unit 107 through the input/output part 113. When the authentication of the user is successful, the control part 111 makes the arithmetic part 112 generate a private key, using the public parameters and the master key kept in the master key holding part 115, and using the user's ID held in the intermediate data holding part 114. Then, the generated secret key is outputted through the external input/output part 110. Processing of generating a private key is described below referring to FIG. 2. In the present embodiment, description is given taking an example where a user's ID used for authentication is used as a public key. However, any character string may be used as a public key, without being limited to this embodiment.

In the case where the authentication ends in failure, the private key generation processing is not performed, and a notice to this end is sent to the requester.

Next, will be described operation of the control part 135 of the encryption and signature generation unit 103. The control part 135 receives the public parameters from the private key issuing unit 102. Further, at the time of affixing a signature, the control part 135 receives the secret key issued for the user A from the private key issuing unit 102. Using the public parameters, the private key and the ID of the user A, the control part 135 encrypts and/or signs object data and then sends the encrypted and/or signed data to a destination. Detailed processing is as follows.

Prior to encryption and/or sign affixing processing, the control part 135 of the encryption and signature generation unit 103 acquires the public parameters (which are opened to the public by the parameter publication unit 106) through the external input/output part 137, using the communication line 130 or a storage medium, and keeps the public parameters in the data holding part 139.

Further, when a sign is to be affixed, the control part 135 requests the private key issuing unit 102 to issue a private key, receives a private key issued for the user A through the external input/output part 137, using the safe communication line 131 from which information is not leaked out or using a storage medium, and stores the private key into the private key holding part 140. As a safe communication method in the present embodiment, may be considered, for example, cryptographic communication such as SSL communication, or a method using a communication line dedicated for sending and receiving a private key.

Then, the control part 135 stores processing specifications and object data inputted through the input/output part 134 into the intermediate data holding part 129. Further, according to instructions shown in the processing specifications, the control part 135 makes the arithmetic part 127 perform encryption and/or signature verification processing, and sends an operation result to the decryption and signature verification unit 104 through the external input/output part 137, using the communication line 141 or a storage medium. Processing of encryption and/or signature affixing will be described later referring to FIG. 7.

Next, will be described operation of the control part 147 of the decryption and signature verification unit 104. The control part 147 receives the public parameters from the private key issuing unit 102. Further, at the time of decryption, the control part 147 receives the private key issued for the user B from the private key issuing unit 102. Using the public parameters, the private key and the ID of the user B, the control part 147 decrypts the received data and/or verify the affixed sign. Detailed processing is as follows.

Prior to decryption and/or sign verification processing, the control part 147 of the decryption and signature verification unit 104 acquires the public parameters (which have been opened to the public by the parameter publication unit 106) through the external input/output part 149, using the communication line 142 or a storage medium, and keeps the acquired public parameters in the data holding part 151.

Further, at the time of decryption processing, the control part 147 requests the private key issuing unit 102 to issue a private key, and acquires a private key issued for the user B through the external input/output part 149, using the safe communication line 143, from which information is not leaked out, or using a storage medium. The acquired private key is held in the private key holding part 140.

Then, the control part 147 stores object data inputted through the external input/output part 149 into the intermediate data holding part 150, and makes the arithmetic part 148 perform decryption and/or signature verification processing on the object data, and outputs an operation result to the user B through the input/output part 146. Processing of decryption and/or signature verification will be described later referring to FIG. 12. The present embodiment is described taking an example where processing to be performed by the control part 147 is judged based on a type of object data received. However, it may be arranged such that received object data include information showing processing specifications.

Hereinabove, functions of each unit as a constituent of the ID-based encryption and signature system 101 have been described in detail. Each unit may be realized on an information processing unit of a general configuration, comprising a CPU, a memory, an external storage such as a hard disk unit or the like, an input unit such as a keyboard, an output unit such as a display, and an interface with the external storage and the input and output units.

Each of the processing parts 110-113, 118-120, 125-127, 134-137, or 146-149 of the control and arithmetic part 108, 116, 123, 132 or 144 of each unit as a constituent of the system is realized as a process that is implemented on an information processing unit when the CPU executes a program (also called a code module) loaded on the memory. Further, a memory or an external storage is used as the holding part(s) 114, 115, 121, 122, 128, 129, 138-140, 150-152 of the storage part 109, 117, 124, 133 or 145 of each unit.

Further, each program mentioned above is stored in advance in an external storage, loaded onto a memory at need, and executed by a CPU. Each program mentioned above may be loaded onto a memory at need through an external storage that can deal with a portable storage medium (for example, a CD-ROM). Or, a program may be once installed from a portable storage medium onto an external storage, and then, loaded from the external storage onto a memory at need. Or, a program may be once downloaded onto an external storage through a network (not shown) using a transmission signal (i.e., a kind of medium that can be read by an information processing unit on the network), and thereafter loaded onto a memory. Or, a program may be directly loaded onto a memory through a network.

Next, referring to FIGS. 2-15, each processing of generation of public parameters and the like, encryption, signature affixing, decryption and signature verification will be described in detail, as operation of an arithmetic part of each unit in the ID-based encryption and signature system 101 of the present embodiment.

First, will be described operation of the arithmetic part 112 of the private key generation unit 105.

Figure 2:
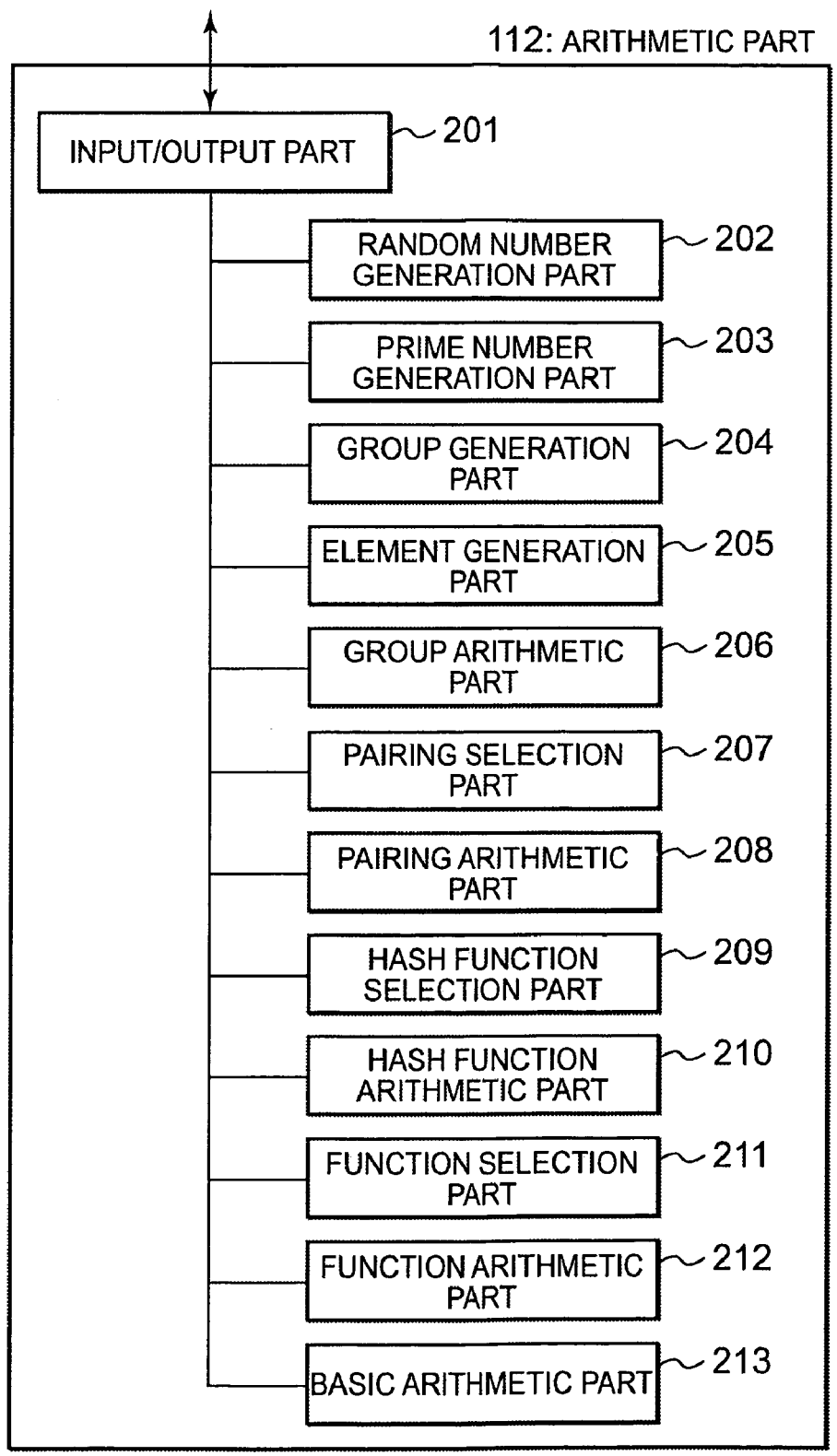
FIG. 2 is a functional block diagram showing an arithmetic part 112 of a private key issuing unit 102 according to the embodiment.

FIG. 2 is a functional block diagram showing the arithmetic part 112. The arithmetic part 112 generates the public parameters, the master key and private keys.

As shown in the figure, the arithmetic part 112 comprises: an input/output part 201 for inputting and outputting from and to another functional part such as the control part 111; a random number generation part 202 for generating a random number; a prime number generation part 203 that generates a prime number by repeating primarity tests on random numbers generated by the random number generation part 202 until a prime number is found; a group generation part 204 that generates a group; an element generation part 205 that generates an element of a group randomly; a group arithmetic part 206 that performs group operations; a pairing selection part 207 that selects a pairing; a pairing arithmetic part 208 that performs a pairing operation; a hash function selection part 209 that selects a hash function; a hash function arithmetic part 210 that calculates a hash value; a function selection part 211 that selects a function; a function arithmetic part 212 that performs a function operation; and a basic arithmetic part 213 that performs ordinary operations. In the present embodiment, the basic arithmetic part 213 performs a residue operation (mod) and the like. The basic arithmetic part 213 is called not only directly from an encryption algorithm but also from another arithmetic part, for example, the group arithmetic part 206 or the pairing arithmetic part 208.

Figure 3:
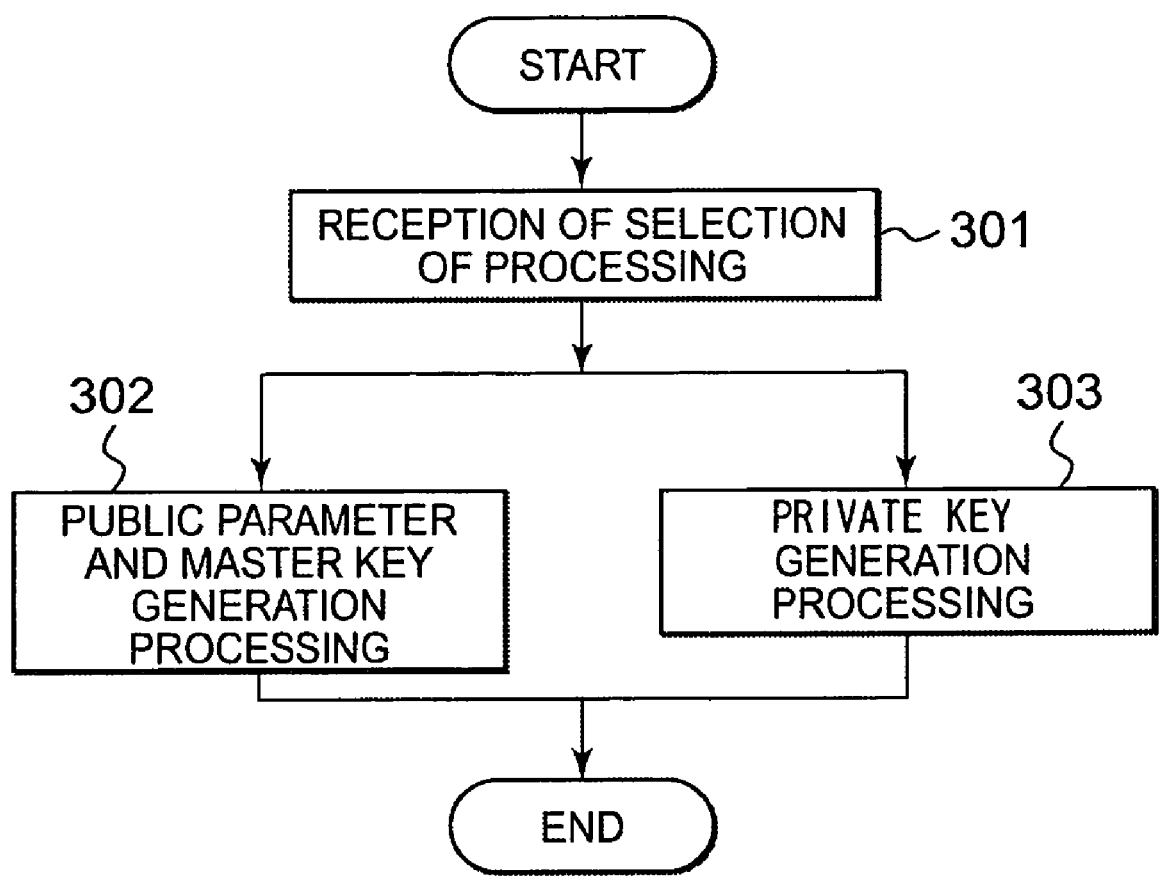
FIG. 3 is a flowchart for explaining processing in the arithmetic part 112 of the private key issuing unit 102 according to the embodiment.

FIG. 3 is a flowchart for explaining processing in the arithmetic part 112 for generating public parameters and a master key or a private key. In the following, processing of generating public parameters and a master key is called public parameter and master key generation processing, and processing of generating a private key is called private key generation processing.

<Step 301>

A selection of processing is received from the control part 111. When the public parameter and master key generation processing is selected, the flow goes to Step 302, while the private key generation processing is selected, the flow goes to Step 303. As described above, when the control part 111 receives a private key issuing request from the encryption and signature generation unit 103 or the decryption and signature verification unit 104 and an authentication result of success from the authentication unit 107, then the control part 111 designates the private key generation processing.

<Step 302>

In the case where the public parameter and master key generation processing is selected, that processing is performed. The processing will be described below in detail referring to FIG. 4.

<Step 303>

In the case where the private key generation processing is selected, that processing is performed. The processing will be described below in detail referring to FIG. 5.

Figure 4:
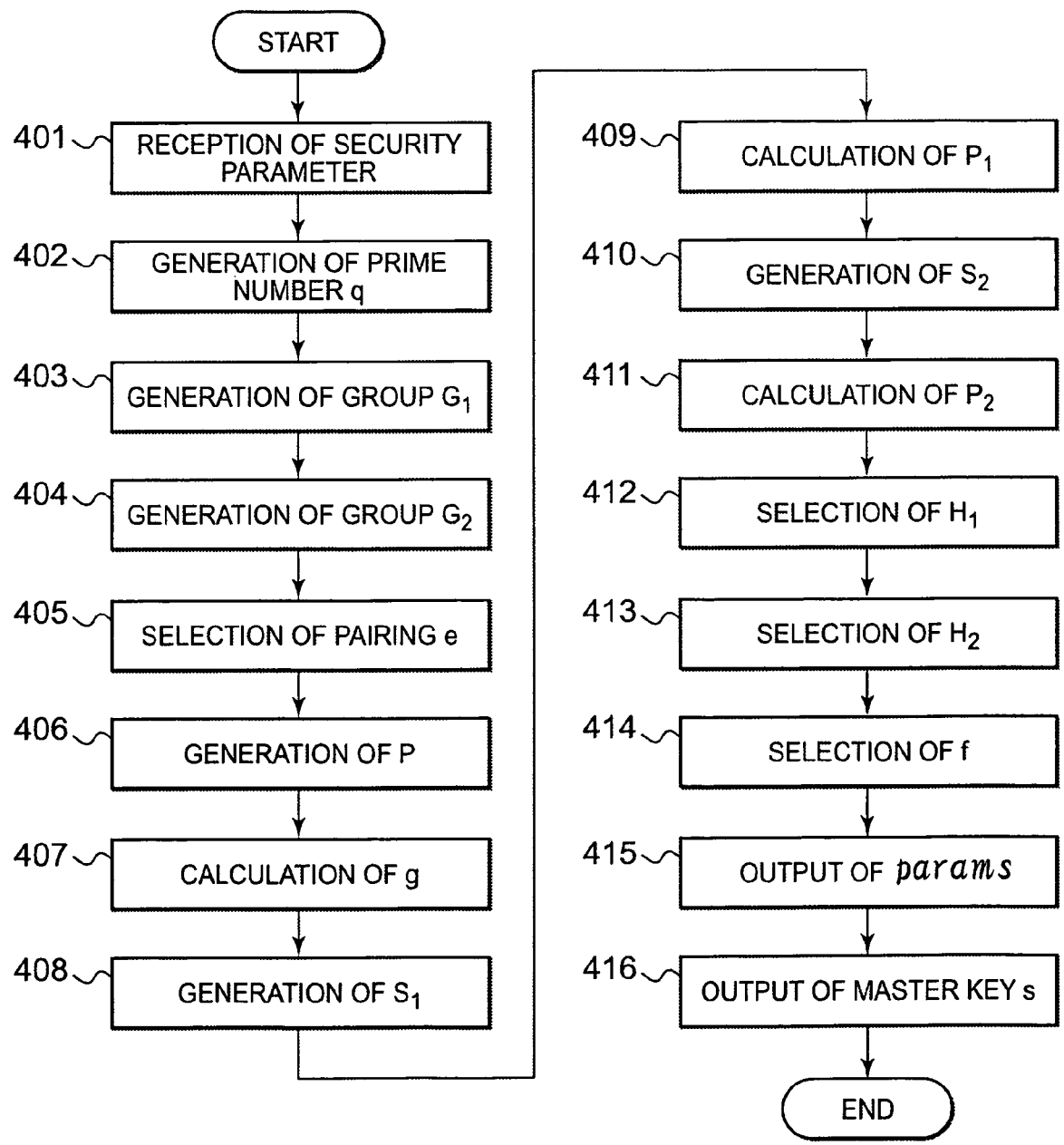
FIG. 4 is a flowchart for explaining public parameter and master key generation processing.

Next, will be described the public parameter and master key generation processing in the above Step 302 of FIG. 3. FIG. 4 is a flowchart for explaining the public parameter and master key generation processing.

<Step 401>

A security parameter $k \in Z^+$ is received through the input/output part 201.

<Step 402>

The prime number generation part 203 generates a k bit prime number q.

<Step 403>

The group generation part 204 selects a group $G_1$ of order q.

<Step 404>

The group generation part 204 selects a group $G_2$ of order q.

<Step 405>

The pairing selection part 207 selects a pairing e: $G_1 \times G_1 \to G_2$.

<Step 406>

The element generation part 205 generates a generator P of $G_1$.

<Step 407>

The pairing arithmetic part 208 calculates g=e(P, P).

<Step 408>

The random number generation part 202 generates a random number $s_1$ satisfying $s_1 \in Z_q^*$.

<Step 409>

The group arithmetic part 206 calculates $P_1 = s_1 P$.

<Step 410>

The random number generation part 202 generates a random number $s_2$ satisfying $s_2 \in Z_q^*$.

<Step 411>

The group arithmetic part 206 calculates $P_2 = s_2 P$.

<Step 412>

The hash function selection part 209 selects a hash function $H_1: \{0, 1\}^* \to Z_q^*$.

<Step 413>

The hash function selection part 209 selects a hash function $H_2: G_2 \to \{0, 1\}^*$.

<Step 414>

The function selection part 211 selects a function $f: Z_q^* \to Z_q^*$.

<Step 415>

The above-calculated parameters q, $G_1$, $G_2$, e, g, $P_1$, $P_2$, $H_1$, $H_2$ and f are outputted as public parameters params through the input/output part 201 (params=<q, $G_1$, $G_2$, e, g, $P_1$, $P_2$, $H_1$, $H_2$, f>).

<Step 416>

The above-calculated parameters P, $s_1$ and $s_2$ are outputted as a master key s through the input/output part 201 (s=<P, $s_1$, $s_2$>).

The outputted public parameters params and master key s are held in the master key holding part 115.

Figure 5:
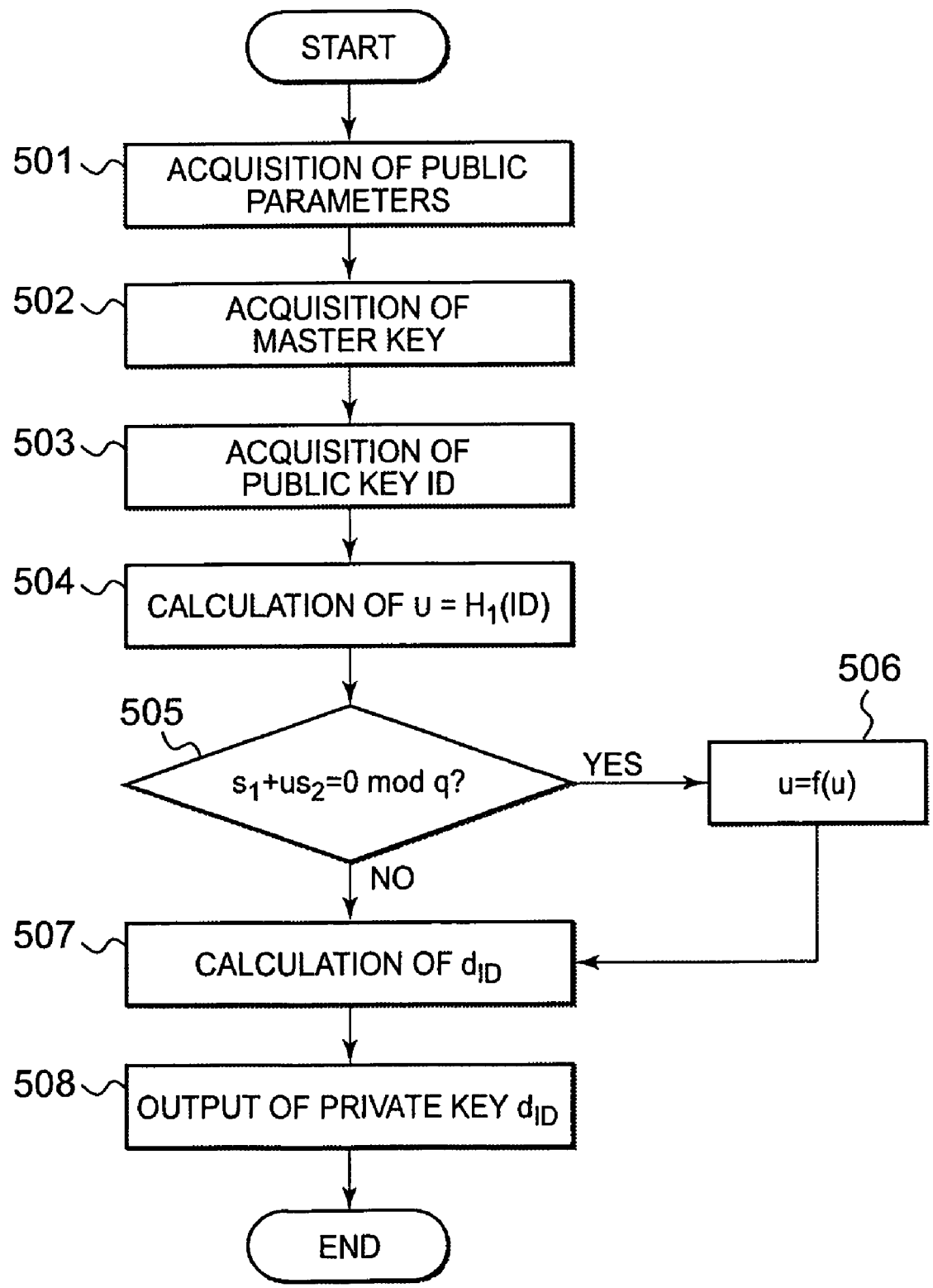
FIG. 5 is a flowchart for explaining private key generation processing according to the embodiment.

Next, will be described the private key generation processing in the above Step 303 of FIG. 3. FIG. 5 is a flowchart for explaining the private key generation processing.

<Step 501>

The public parameters params held in the master key holding part 115 are received through the input/output part 201.

<Step 502>

The master key s held in the master key holding part 115 is received through the input/output part 201.

<Step 503>

An ID$\in \{0, 1\}^*$ of a user who requests the private key is received through the input/output part 201. Here, the ID is held in the intermediate data holding part 114.

<Step 504>

The hash function arithmetic part 210 calculates a hash value u of the user's ID (u=$H_1$(ID)$\in Z_q^*$).

<Step 505>

The basic arithmetic part 213 calculates $s_1 + u s_2$ using the master key s and the public parameters params, and judges whether $s_1 + u s_2 = 0 \mod q$ is satisfied or not. In the case where $s_1 + u s_2 = 0 \mod q$ is satisfied, the flow proceeds to Step 506. Otherwise, the flow proceeds to Step 507.

<Step 506>

Using the function f included in the public parameters params, the function arithmetic part 212 replaces u by f(u) (updating u by u=f(u)).

<Step 507>

Using the master key s and the public parameters params, the group arithmetic part 206 calculates $(s_1 + u s_2)^{-1} P$ to obtain the private key $d_{ID}$ ($d_{ID} = (s_1 + u s_2)^{-1} P$).

<Step 508>

The calculated private key $d_{ID}$ is outputted through the input/output part 201.

Figure 6:
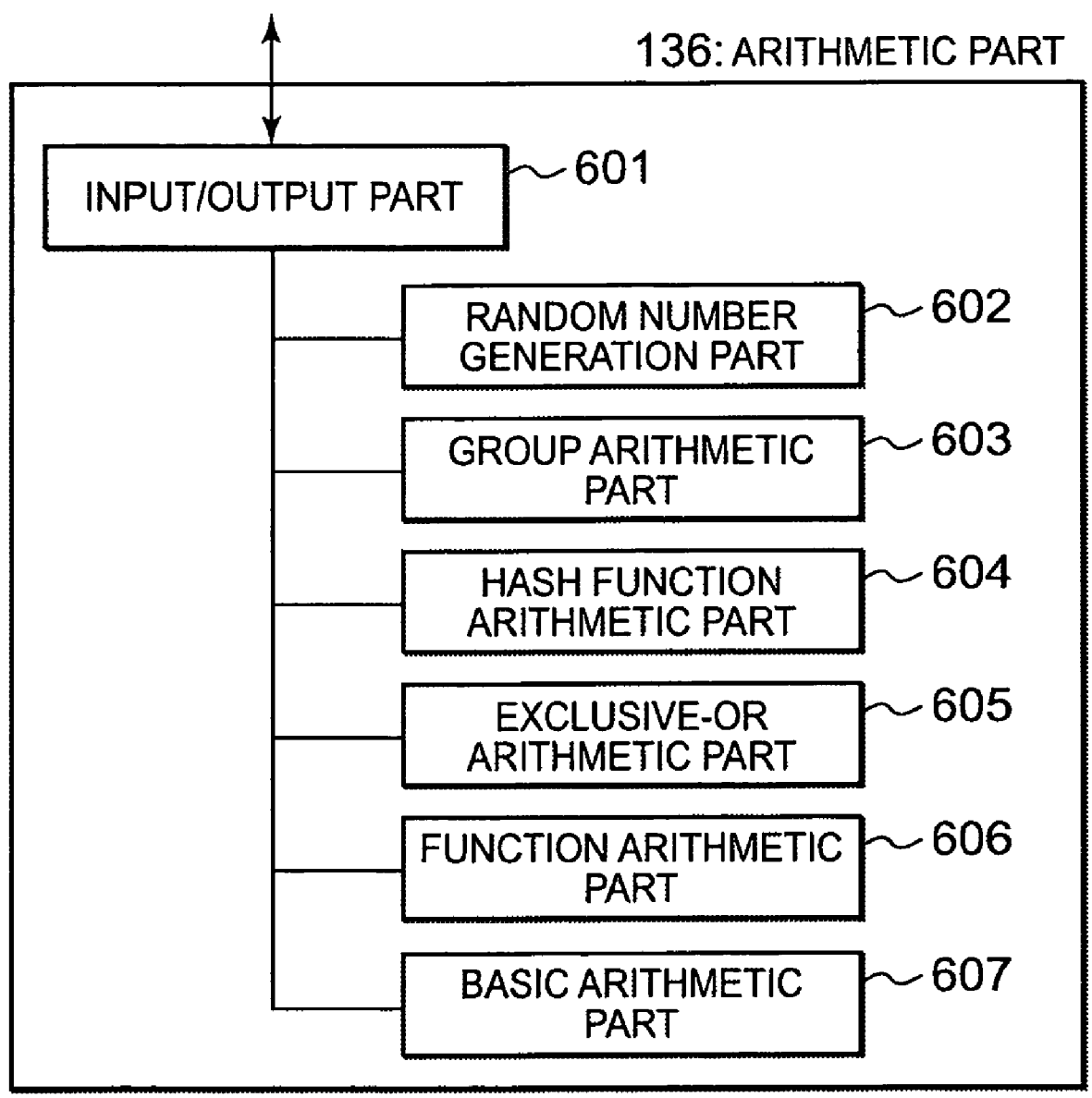
FIG. 6 is a functional block diagram of an arithmetic part 136 of an encryption and signature generation unit 103 according to the embodiment.

Next, will be described operation of the arithmetic part 136 of the encryption and signature generation unit 103. FIG. 6 is a functional block diagram showing the arithmetic part 136 of the encryption and signature generation unit 103. In the present embodiment, the arithmetic part 136 performs three types of processing, i.e., encryption, signature generation, and encryption and signature generation, which are called respectively encryption processing, signature generation processing and encryption and signature generation processing.

The arithmetic part 136 comprises: an input/output part 601 for inputting and outputting from and to another functional part such as the control part 135; a random number generation part 602 for generating a random number; a group arithmetic part 603 that performs group operations; a hash function arithmetic part 604 that calculates a hash value; an exclusive-OR arithmetic part 605 that calculates an exclusive OR; a function arithmetic part 606 that performs a function operation; and a basic arithmetic part 607 that has functions similar to the basic arithmetic part 213.

Figure 7:
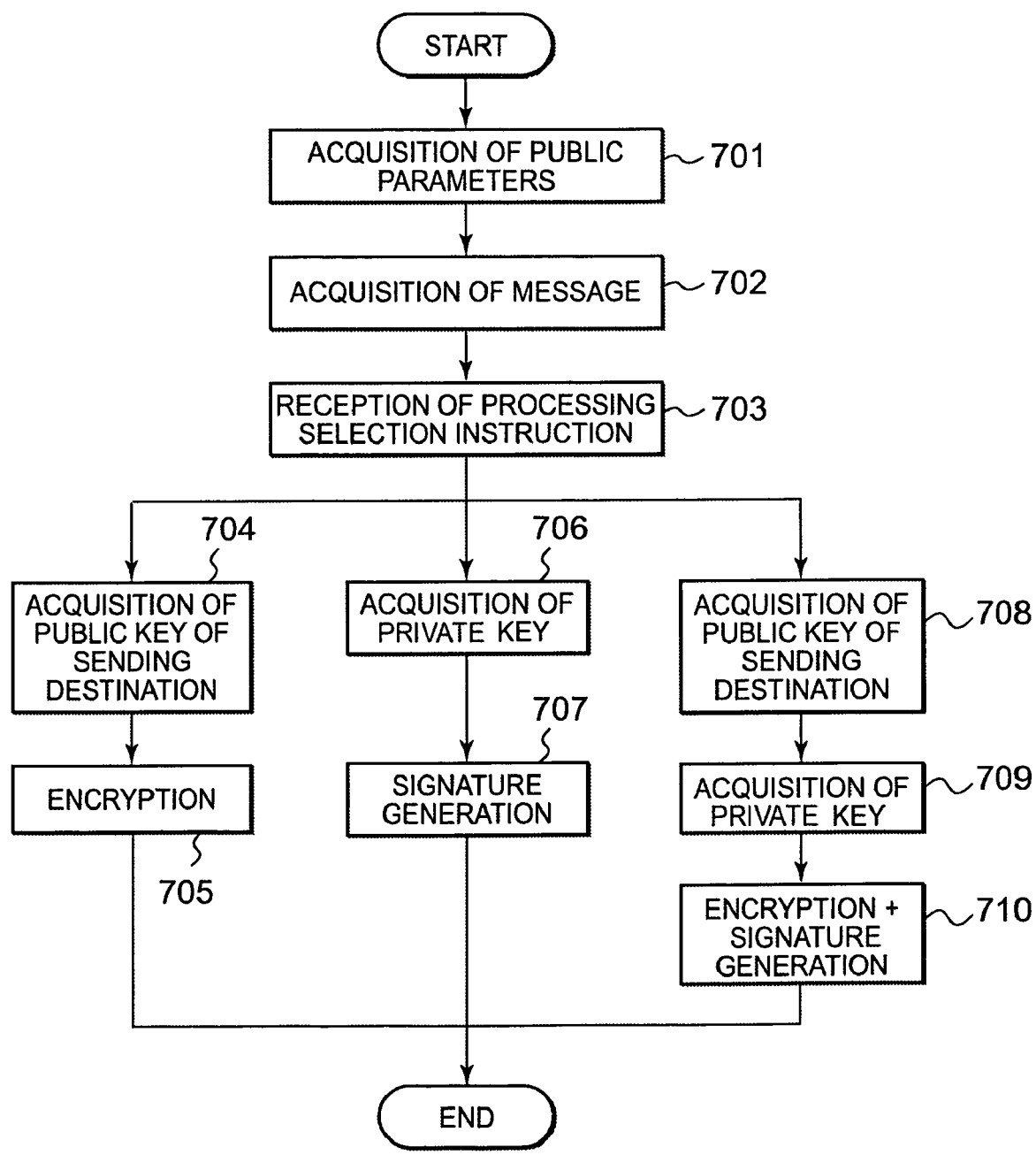
FIG. 7 is a flowchart for explaining processing in the arithmetic part 136 of the encryption and signature generation unit 103 according to the embodiment.

FIG. 7 is a flowchart for explaining processing in the arithmetic part 136 when the encryption processing, the signature generation processing or the encryption and signature generation processing is performed.

<Step 701>

The public parameters params, which have been acquired in advance and are held in the data holding part 139, are received through the input/output part 601.

<Step 702>

A message M inputted by the user A is received through the input/output part 601.

<Step 703>

An instruction of processing is received from the control part 135 through the input/output part 601. The processing is selected from the three types of processing, i.e., encryption, signature generation, and encryption and signature generation. When the encryption processing is selected, the flow proceeds to Step 704. When the signature generation processing is selected, the flow proceeds to Step 706. And, when the encryption and signature generation processing is selected, the flow proceeds to Step 708.

<Step 704>

In the case where the encryption processing is selected, a public key IDB∈{0, 1}* of a sending destination is received from the data holding part 139 through the input/output part 601. In the present embodiment, a user's ID is used as the public key IDB of the sending destination.

<Step 705>

Using the public parameters params and the public key IDB, the message M is encrypted. The encryption processing will be described below in detail referring to FIG. 8.

<Step 706>

In the case where the signature generation processing is selected, a private key $d_{IDA}$ of a signer is received from the private key holding part 140 through the input/output part 601. In the present embodiment, the signer is the user A of the encryption and signature generation unit 103.

<Step 707>

Using the public parameters params and the private key $d_{IDA}$, a signature is affixed to the message M. The signature generation and affixing processing will be described below in detail referring to FIG. 9.

<Step 708>

In the case where the encryption and signature generation processing is selected, the public key IDB of a sending destination is received from the data holding part 139 through the input/output part 601.

<Step 709>

Further, the private key $d_{IDA}$ of the signer is received from the private key holding part 140 through the input/output part 601.

<Step 710>

Using the public parameters params, the public key IDB and the private key $d_{IDA}$, a signature is generated and the message M is encrypted. The encryption and signature generation processing will be described below in detail referring to FIG. 10.

Figure 8:
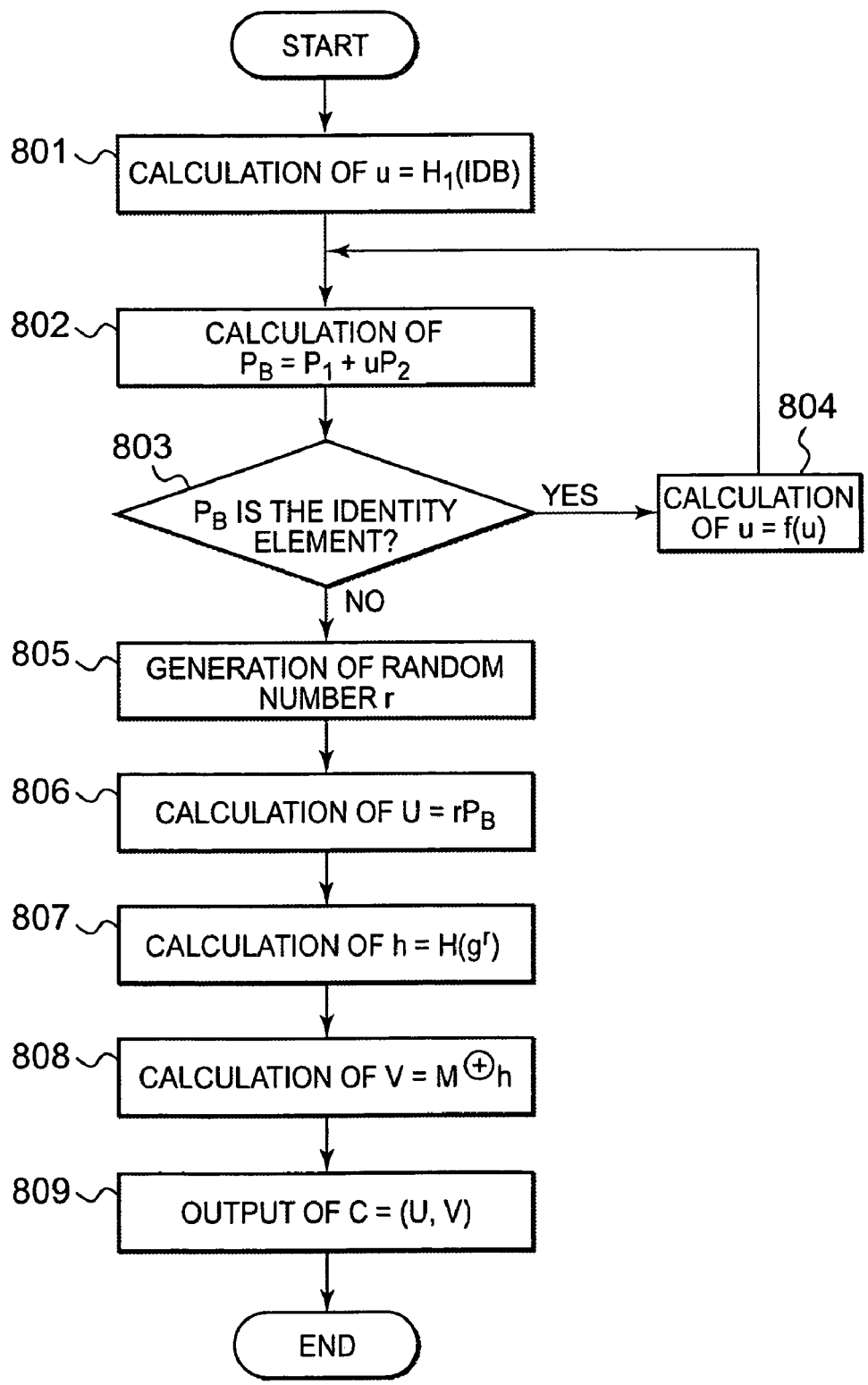
FIG. 8 is a flowchart for explaining encryption processing according to the embodiment.

Next, will be described the encryption processing performed in the above Step 705 of FIG. 7. FIG. 8 is a flowchart for explaining the encryption processing.

<Step 801>

Using the hash function $H_1$ included in the public parameters params, the hash function arithmetic part 604 calculates a hash value $u=H_1(IDB)$ of the public key IDB.

<Step 802>

Using the public parameters params, the group arithmetic part 603 calculates $P_B=P_1+uP_2$.

<Step 803>

The group arithmetic part 603 judges whether the calculated $P_B$ is the identity O in $G_1$ or not. In the case where $P_B$ is the identity O in $G_1$, the flow proceeds to Step 804. Otherwise, the flow proceeds to Step 805.

<Step 804>

When $P_B$ is the identity O in $G_1$, the function arithmetic part 606 replaces u by f(u) (updating u by u=f(u)), using the function f included in the public parameters params, and the flow returns to Step 802.

<Step 805>

In the case where $P_B$ is not the identity O in $G_1$, the random number generation part 602 generates a random number $r \in Z_q^*$.

<Step 806>

The group arithmetic part 603 calculates $U=rP_B$.

<Step 807>

Using the hash function $H_2$ included in the public parameters params, the hash function arithmetic part 604 calculates $h=H_2(g^r)$.

<Step 808>

The exclusive-OR arithmetic part 605 calculates V=M XOR h.

<Step 809>

The above-calculated U and V are outputted as encrypted data C=(U, V) through the input/output part 601.

Figure 9:
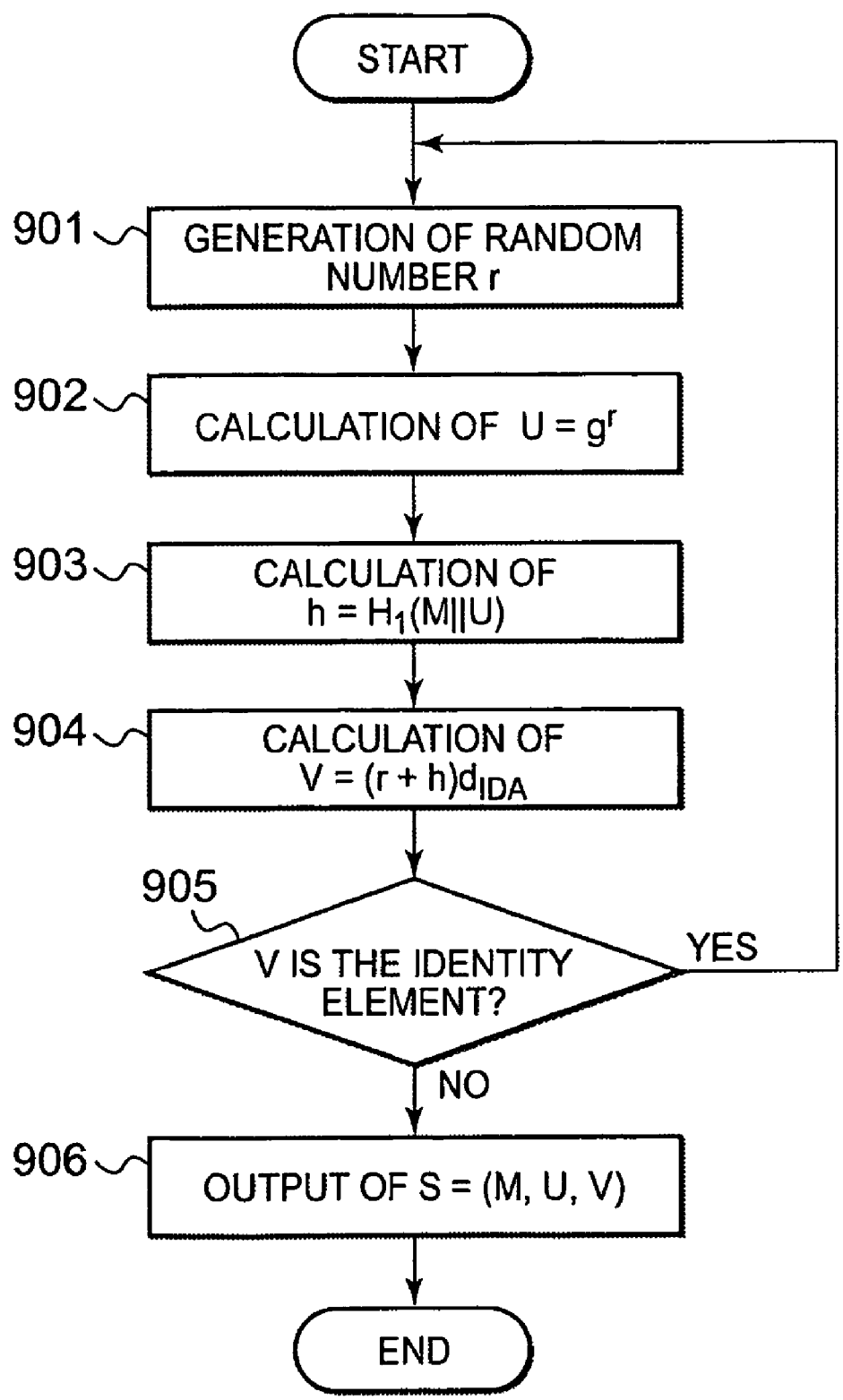
FIG. 9 is a flowchart for explaining signature generation and affixing processing according to the embodiment.

Next, will be described the signature generation processing in the above Step 707 of FIG. 7. FIG. 9 is a flowchart for explaining the signature generation and affixing processing.

<Step 901>

The random number generation part 602 generates a random number $r \in Z_q^*$.

<Step 902>

Using the public parameters params, the basic arithmetic part 607 calculates $U=g^r$.

<Step 903>

Using the hash function $H_1$ included in the public parameters params, the hash function arithmetic part 604 calculates $h=H_1(M\|U)$.

<Step 904>

Using the private key $d_{IDA}$, the group arithmetic part 603 calculates $V=(r+h)d_{IDA}$.

<Step 905>

The group arithmetic part 603 judges whether the calculated V is the identity O in $G_1$. In the case where V is the identity O in $G_1$, the flow returns to Step 901.

<Step 906>

The calculated M, U and V are outputted as a signature S=(M, U, V) through the input/output part 601.

Figure 10:
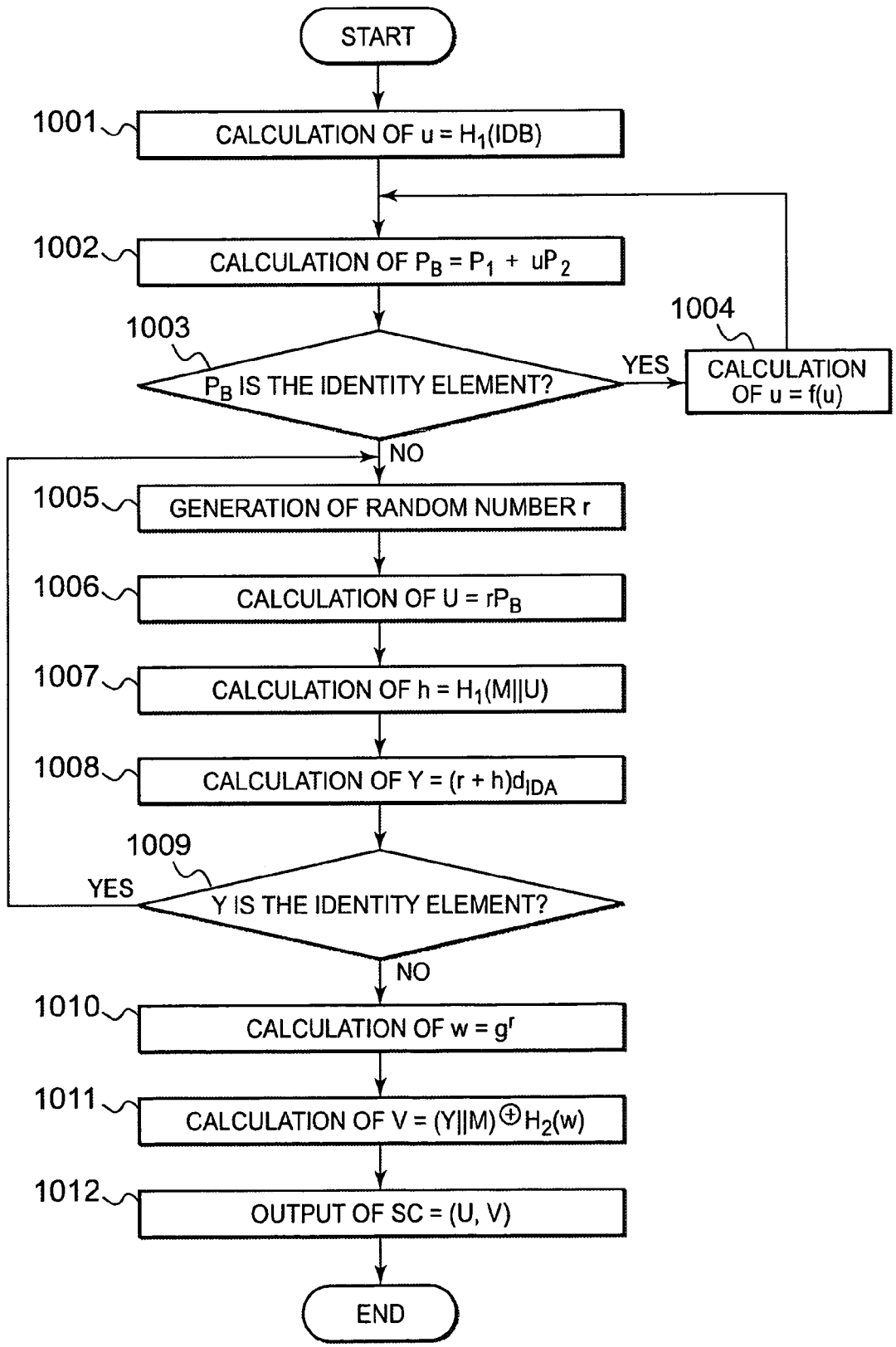
FIG. 10 is a flowchart for explaining encryption and signature generation processing according to the embodiment.

Next, will be described the encryption and signature generation processing performed in Step 710 of FIG. 7. FIG. 10 is a flowchart for explaining the processing.

<Step 1001>

Using the hash function $H_1$ included in the public parameters params, the hash function arithmetic part 604 calculates $u=H_1(IDB)$.

<Step 1002>

Using the public parameters params, the group arithmetic part 603 calculates $P_B=P_1+uP_2$.

\<Step 1003\>

The group arithmetic part 603 judges whether the calculated $P_B$ is the identity O in $G_1$. In the case where $P_B$ is the identity O in $G_1$, the flow proceeds to Step 1004. Otherwise, the flow proceeds to Step 1005.

\<Step 1004\>

When $P_B$ is the identity O in $G_1$, then, the function arithmetic part replaces u by f(u) (updating u by u=f(u)), using the function f included in the public parameters params, and the flow returns to Step 1002.

\<Step 1005\>

When it is judged that $P_B$ is not the identity O in $G_1$, the random number generation part 602 generates a random number $r \in Z_q^*$.

\<Step 1006\>

The group arithmetic part 603 calculates $U=rP_B$.

\<Step 1007\>

Using the hash function $H_1$ included in the public parameters params, the hash function arithmetic part 604 calculates $h=H_1(M\|U)$.

\<Step 1008\>

Using the private key $d_{IDA}$, the group arithmetic part 603 calculates $Y=(r+h)d_{IDA}$.

\<Step 1009\>

The group arithmetic part 603 judges whether the calculated Y is the identity O in $G_1$ or not. In the case where Y is the identity O in $G_1$, the flow returns to Step 1005.

\<Step 1010\>

Using the public parameters params, the basic arithmetic part 607 calculates $w=g^r$.

\<Step 1011\>

Using the hash function $H_2$ included in the public parameters params, the hash function arithmetic part 604, the function arithmetic part 606 and the exclusive-OR arithmetic part 605 calculate $v=H_2(w)$ XOR $(Y\|M)$.

\<Step 1012\>

The above-calculated U and V are collected and outputted as encrypted data affixed with a signature SC=(U, V) through the input/output part 601.

Figure 11:
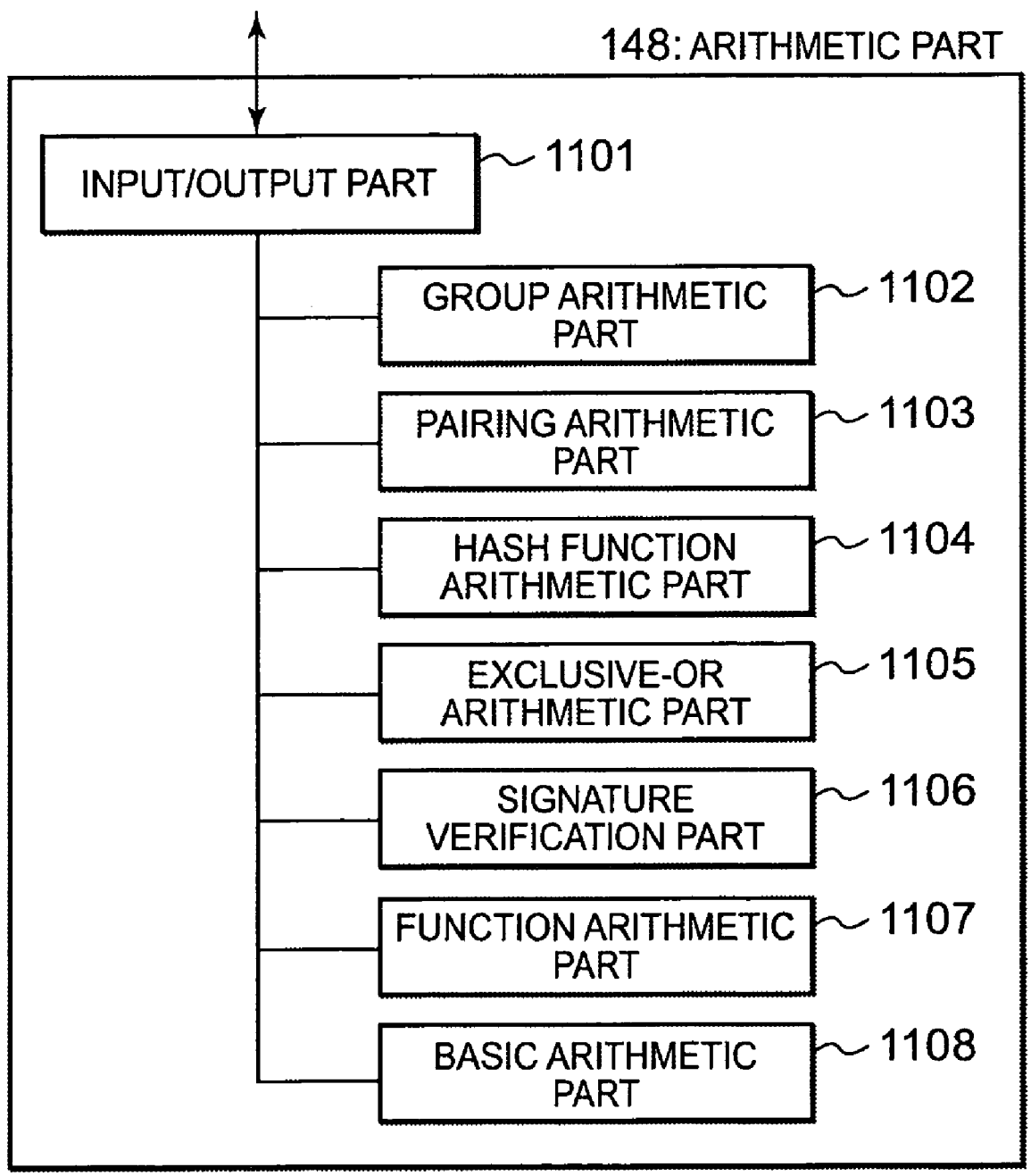
FIG. 11 is a functional block diagram of an arithmetic part 148 of a decryption and signature verification unit 104 according to the embodiment.

Next, will be described operation of the arithmetic part 148 of the decryption and signature verification unit 104. FIG. 11 is a functional block diagram showing the arithmetic part 148 of the decryption and signature verification unit 104. In the present embodiment, the arithmetic part 148 performs three types of processing, i.e., decryption, signature verification, and decryption and signature verification, which are respectively called the decryption processing, the signature verification processing, and the decryption and signature verification processing.

The arithmetic part 148 comprises: an input/output part 1101 for inputting and outputting from and to another functional part such as the control part 147; a group arithmetic part 1102 that performs group operations; a paring arithmetic part 1103 that performs pairing operation; a hash function arithmetic part 1104 that calculates a hash value; an exclusive-OR arithmetic part 1105 that calculates an exclusive OR; a signature verification part 1106 that performs signature verification; a function arithmetic part 1107 that performs a function operation; and a basic arithmetic part 1108 that has functions similar to the basic arithmetic part 213.

Figure 12:
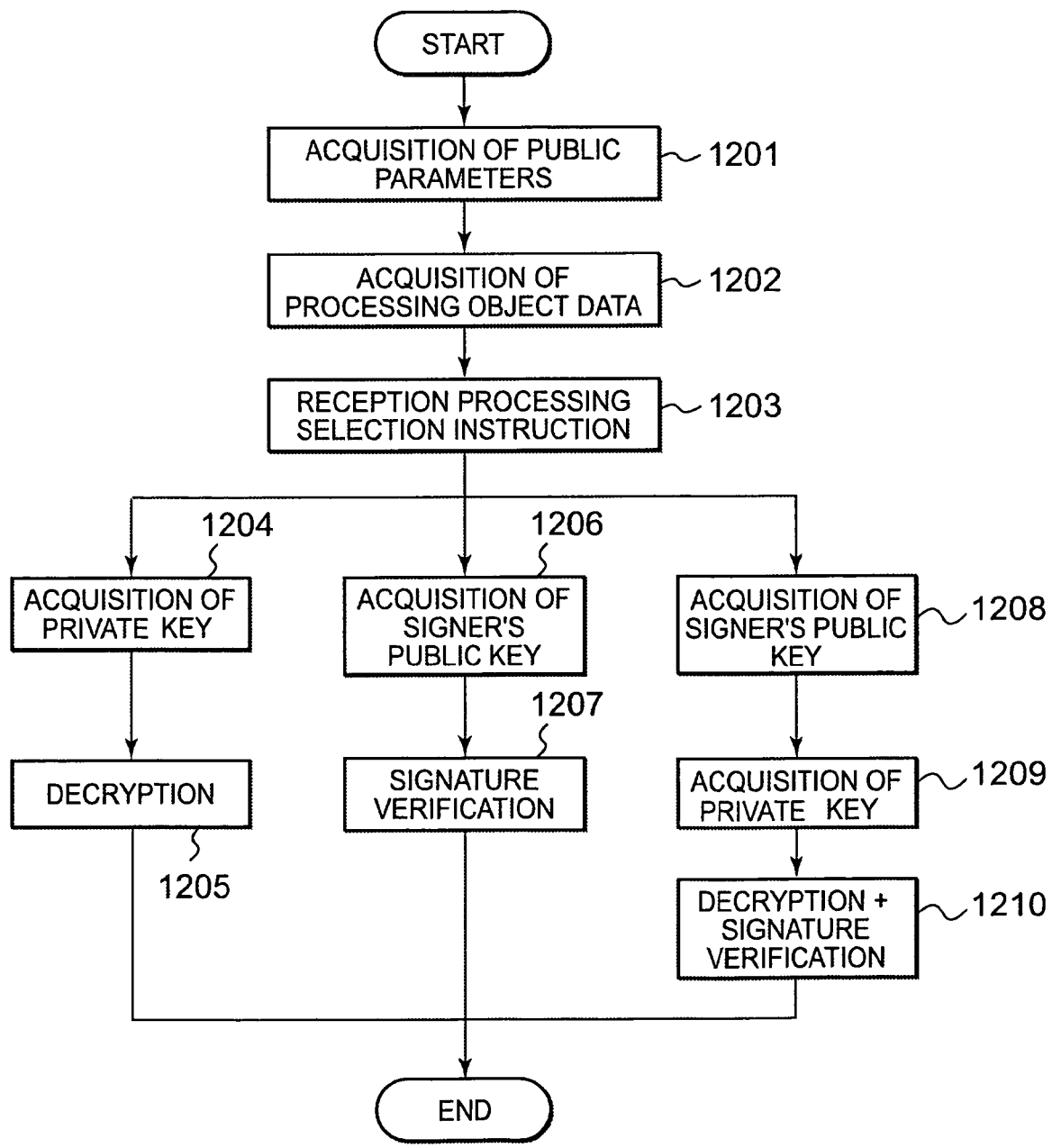
FIG. 12 is a flowchart for explaining processing in the arithmetic part 148 of the decryption and signature verification unit 104 according to the embodiment.

FIG. 12 is a flowchart for explaining processing in the arithmetic part 148 when the decryption processing, the signature verification processing, or the decryption and signature verification processing is performed.

\<Step 1201\>

The public parameters params, which have been acquired in advance and is held in the data holding part 151, are received through the input/output part 1101.

\<Step 1202\>

Processing object data C=(U, V), S=(M, U, V) or SC=(U, V) are received through the input/output part 1101. As described above, C is the encrypted data, S is the signature, and SC is the encrypted data affixed with the signature.

\<Step 1203\>

In the case where the input data received in Step 1202 are C, the flow proceeds to Step 1204. In the case where the input data are S, the flow proceeds to Step 1206. And, in the case where the input data are SC, the flow proceeds to Step 1208. Or, if the processing object data is affixed with information that specifies processing to be performed thereafter, the flow proceeds according to the information.

\<Step 1204\>

When the input data received are C, the decryption processing is performed. To perform the decryption processing, a private key $d_{IDB}$ of a decrypting person is received from the private key holding part 152 through the input/output part 1101. In the present embodiment, the decrypting person is the user B of the decryption and signature verification unit 104.

\<Step 1205\>

Using the public parameters params and the private key $d_{IDB}$, the decryption processing is performed to decrypt the processing object data C. The decryption processing will be described below in detail referring to FIG. 13.

\<Step 1206\>

When the input data received are S, the signature verification processing is performed. To perform the signature verification processing, a public key IDA$\in\{0, 1\}^*$ of the signer is received from the data holding part 151 through the input/output part 1101. In the present embodiment, the signer is the sender of the processing object data S, i.e., the user A of the encryption and signature generation unit 103, and his public key IDA is the ID of the user A. In the present embodiment, the ID has been determined according to predetermined rules, and known to all the users or received together with the object data S.

\<Step 1207\>

Using the public parameters params and the public key IDA, the signature verification part 1106 performs the signature verification processing on the signature affixed to the object data S. The signature verification processing will be described below in detail referring to FIG. 14.

\<Step 1208\>

When the received data are SC, the decryption and signature verification processing is performed. To perform the decryption and signature verification processing, the public key IDA$\in\{0, 1\}^*$ of the signer is received from the data holding part 151 through the input/output part 1101.

\<Step 1209\>

Further, the private key $d_{IDB}$ of the decrypting person is received from the private key holding part 152 through the input/output part 1101.

\<Step 1210\>

Using the public parameters params, the public key IDA and the private key $d_{IDB}$, the decryption and signature verification processing is performed on the received object data SC. The decryption and signature verification processing is described below in detail referring to FIG. 15.

Figure 13:
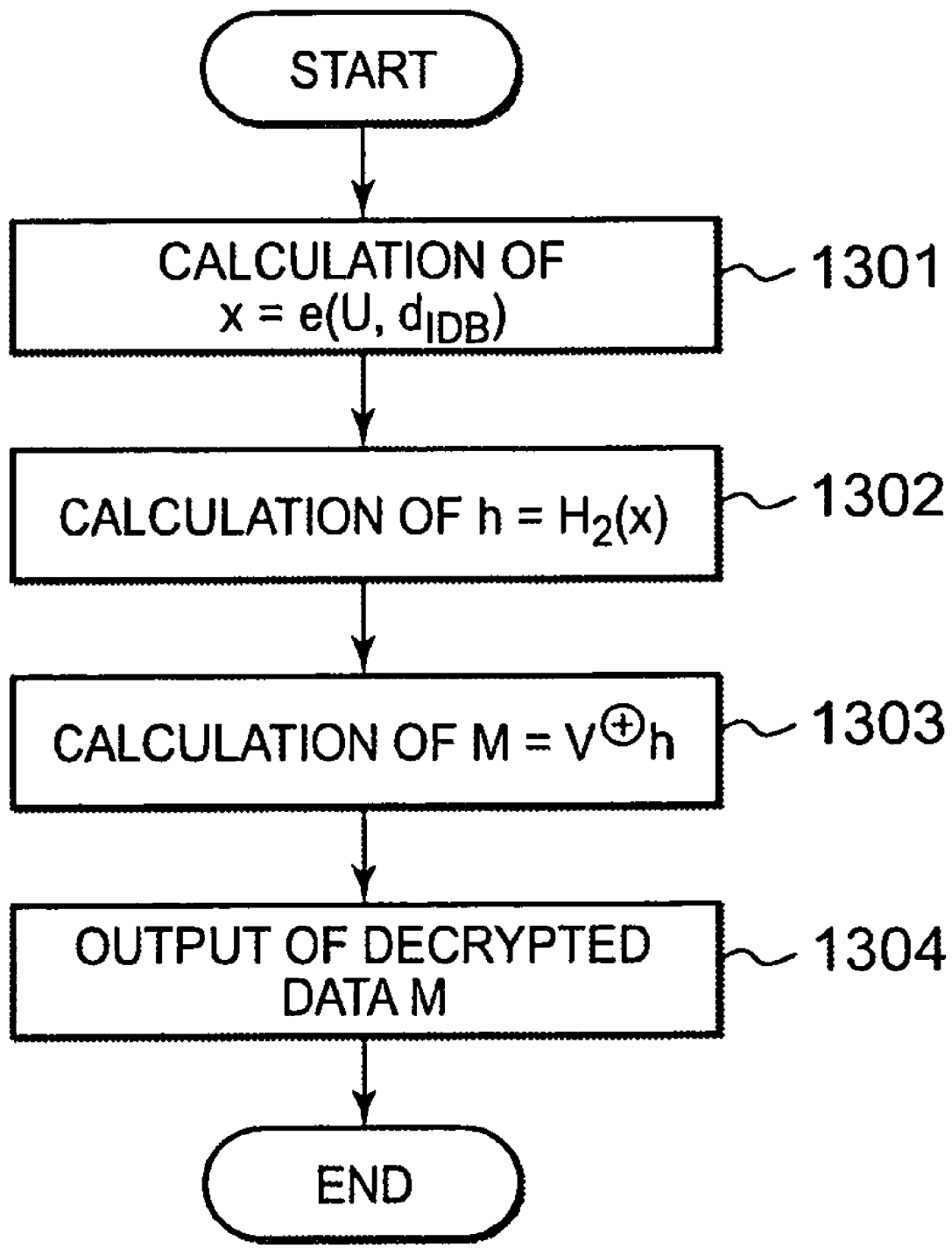
FIG. 13 is a flowchart for explaining decryption processing according to the embodiment.

Next, will be described the decryption processing performed in the above Step 1205 of FIG. 12. FIG. 13 is a flowchart for explaining the decryption processing.

<Step 1301>

Using the private key $d_{IDB}$, U of the encrypted data C=(U, V) and the public parameters params, the pairing arithmetic part 1103 calculates $x=e(d_{IDB}, U)$.

<Step 1302>

Using the hash function $H_2$ included in the public parameters params, the hash function arithmetic part 1104 calculates a hash value $h=H_2(x)$ of x.

<Step 1303>

The exclusive-OR arithmetic part 1105 calculates an exclusive OR, M=V XOR h between V of the encrypted data C=(U, V) and the above hash value h.

<Step 1304>

The calculated M is outputted as decrypted data M through the input/output part 1101.

Figure 14:
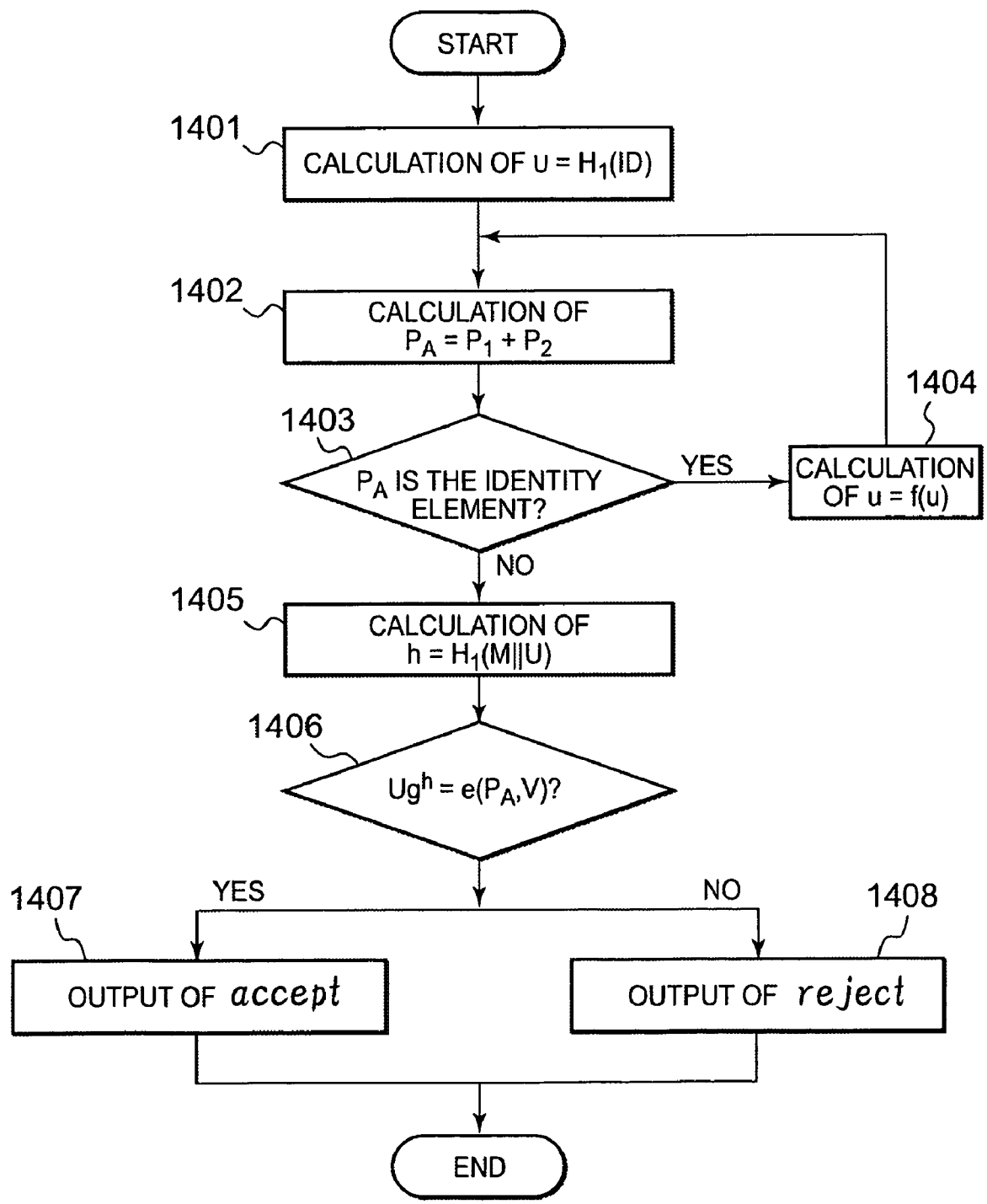
FIG. 14 is a flowchart for explaining signature verification processing according to the embodiment.

Next, will be described the signature verification processing performed in the above Step 1207 of FIG. 12. FIG. 14 is a flowchart for explaining the signature verification processing.

<Step 1401>

Using the public key IDA of the signer, the hash function arithmetic part 1104 calculates $u=H_1(IDA)$.

<Step 1402>

Using the public parameters params, the group arithmetic part 1102 calculates $P_A=P_1+uP_2$.

<Step 1403>

The group arithmetic part 1102 judges whether the calculated $P_A$ is the identity O in $G_1$ or not. In the case where $P_A$ is the identity O in $G_1$, the flow proceeds to Step 1404. Otherwise, the flow proceeds to Step 1405.

<Step 1404>

When $P_A$ is the identity O in $G_1$, then, the function arithmetic part 1107 replaces u by f(u) (updating u by u=f(u)), using the function f included in the public parameters params, and then, the flow returns to Step 1402.

<Step 1405>

When $P_A$ is not the identity O in $G_1$, then the hash function arithmetic part 1104 calculates $h=H_1(M\|U)$, using the hash function $H_1$ included in the public parameters params and the signature S=(M, U, V).

<Step 1406>

The group arithmetic part 1102 and the pairing arithmetic part 1103 calculate $Ug^r$ and $e(P_A, V)$, using the public parameters params, the signature and the like, and the signature verification part 1106 judges whether $Ug^r=e(P_A, V)$ is satisfied, to verify the signature. In the case where the equation is satisfied, the signature verification is successful, and the flow proceeds to Step 1407. Otherwise, the signature verification ends in failure, and the flow proceeds to Step 1408.

<Step 1407>

In the case where the above equation is satisfied, accept is outputted through the input/output part 1101, to end the processing.

<Step 1408>

In the case where the above equation is not satisfied, reject is outputted through the input/output part 1101, to end the processing.

Next, will be described the decryption and signature verification processing performed in the above Step 1210 of FIG. 12. FIG. 15 is a flowchart for explaining the decryption and signature verification processing.

<Step 1501>

Using the hash function $H_1$ included in the public parameters params and the public key IDA of the signer, the hash function arithmetic part 1104 calculates a hash value $u=H_1(IDA)$ of the signer's public key.

<Step 1502>

Using the public parameters params, the group arithmetic part 1102 calculates $P_A=P_1+uP_2$.

<Step 1503>

The group arithmetic part 1102 judges whether the calculated $P_A$ is the identity O in $G_1$ or not. In the case where $P_A$ is the identity O, the flow proceeds to Step 1504. Otherwise, the flow proceeds to Step 1505.

<Step 1504>

When $P_A$ is the identity O in $G_1$, the group arithmetic part 1102 replaces u by f(u) (updating u by u=f(u)), using the function f included in the public parameters params, and then the flow returns to Step 1502.

<Step 1505>

When $P_A$ is not the identity O in $G_1$, the pairing arithmetic part 1103 calculates $w=e(U, d_{IDB})$, using the encrypted data affixed with the signature SC=(U, V), the private key $d_{IDB}$ of the decrypting person and the public parameters params.

<Step 1506>

Using the encrypted data affixed with the signature SC and the hash function $H_2$ included in the public parameters params, the hash function arithmetic part 1104 and the exclusive-OR arithmetic part 1105 calculate $Y\|M=H_2(w)$ XOR V.

<Step 1507>

Using the hash function $H_1$ included in the public parameters params, the hash function arithmetic part 1104 calculates $h=H_1(M\|U)$.

<Step 1508>

Using the public parameters params and the like, the pairing arithmetic part 1103 and the basic arithmetic part 1108 calculate $e(P_A, Z)$ and $wg^h$ respectively, and the signature verification part 1106 judges whether $e(P_A, Z)=wg^h$ is satisfied or not. In the case where the equation is satisfied, the signature verification is successful, and the flow proceeds to Step 1509. Otherwise, the signature verification ends in failure, and the flow proceeds to Step 1511.

<Step 1509>

When the signature verification ends in success, M is extracted from Y∥M, and outputted as decrypted data M through the input/output part 1101.

<Step 1510>

Further, accept is outputted through the input/output part 1101, to end the processing.

<Step 1511>

On the other hand, when the signature verification ends in failure, reject is outputted through the input/output part 1101, to end the processing.

Hereinabove, each function of the ID-based encryption and signature verification system 101 of the present embodiment and its processing have been described.

As described above, according to the present embodiment, encryption and signing do not require pairing operation that becomes a heavy load. In other words, it is possible to reduce number of times of using paring operation in the entire processing of the encryption processing, decryption processing, sign affixing processing and sign verification processing. As a result, the processing speed is increased, and more efficient ID-based encryption and signature system can be provided.

Further, according to the present embodiment, the method of associating a public key ID and an element of the group $G_1$ does not depend on the structure of the group $G_1$ as described above, and thus degree of freedom of selecting the groups $G_1$ and $G_2$ is increased.

Namely, according to the present embodiment, it is not required to set a hash function that depends on the structure of an elliptic curve, which has been great restriction on free selection of an elliptic curve. As a result, in comparison with the conventional technique, it is possible to select an elliptic curve with higher degree of freedom.

Further, construction of hash functions used for calculation is simplified, and generation of a hash value can be performed at a higher speed.

What is claimed is:

1. A private key generation apparatus in an ID-based signature and encryption system that comprises an encryption apparatus and a decryption apparatus and can use any character string as a public key, wherein:

said private key generation apparatus comprises:

a control and arithmetic unit, and a storage unit, wherein said control and arithmetic unit comprises:

a private key generation and issuing means, which generates public parameters and a master key used in the entire system and stores the generated public parameters and master key into said storage unit, and uses said master key of said storage unit for generating a private key corresponding to a client's public key in response to a request of a client's computer, to issue the generated private key to said client's computer as a requester, where the private key is a most elemental private key initially-formed in the system; and a parameter publication means, which publishes said public parameters of said storage unit; and said private key generation and issuing means:

adds $g=e(P, P)$ (e is a bilinear mapping called a pairing) calculated in advance using a selected element P of a group of order q to said public parameters of said storage unit; and defines two elements $P_1$ and $P_2$ of said group as $P_1=s_1P$ and $P_2=s_2P$, using random numbers $s_1$ and $s_2$ as a part of said master key, with $s_1$ and $s_2$ being included in a set $Z_q^*$ of positive integers less than said order q and relatively prime with q, to calculate $(s_1+us_2)^{-1}P$ as the private key which is the most elemental private key initially-formed in the system.

2. A private key generation apparatus according to claim 1, wherein:

for calculating said q, P, g, $P_1$, $P_2$, $s_1$ and $s_2$ respectively, said private key generation and issuing means comprises:

a prime number generation means, which randomly generates a k bit prime number q for a positive integer k inputted;

a group generation means, which generates two groups $G_1$ and $G_2$ of order q;

an element generation means, which generates an element P of said group $G_1$;

a random number generation means, which generates random numbers $s_1$ and $s_2$ satisfying $0<s_1, s_2<q$;

a group arithmetic means, which performs calculation of $P_1=s_1P$ and $P_2=s_2P$;

a pairing selection means, which selects a pairing e: $G_1 \times G_1 \rightarrow G_2$;

a paring arithmetic means, which calculates $g=e(P, P)$;

a hash selection means, which selects hash functions $H_1$: $\{0, 1\}^* \rightarrow Z_q^*$ and $H_2$: $G_2 \rightarrow \{0, 1\}^*$;

a function selection means, which selects a function f: $Z_q^* \rightarrow Z_q^*$;

a function arithmetic means, which performs a function operation; and a basic arithmetic means, which performs a residue operation.

3. A private key generation apparatus according to claim 2, wherein;

said parameter publication means publishes $<q, G_1, G_2, e, g, P_1, P_2, H_1, H_2, f>$ as said public parameters; and said private key generation and issuing means stores $<P, s_1, s_2>$ into said storage unit as said master key.

4. A private key generation apparatus according to claim 2, wherein:

when said public key is ID and when $d_{ID}=(s_1+us_2)^{-1}P$ can not be calculated for $u=H_1(ID)$, then said private key generation and issuing means generates $d_{ID}=(s_1+f(u)s_2)^{-1}P$ as the private key of said client.

5. An encryption and signature generation apparatus in an ID-based signature and encryption system that comprises a private key generation apparatus according to claim 1 and can use any character string as a public key, wherein:

said encryption and signature generation apparatus comprises an encryption and signature generation means, which performs at least one of a message encryption processing performed using the public parameters published by said private key generation apparatus and a public key of a recipient and a signature generation processing performed using said public parameters and a said client's private key issued by said private key generation apparatus;

said encryption and signature generation means associates an element $P_{ID}$ of a group (which is selected when said public parameters are generated) of order q with the public key, by calculating $P_{ID}=P_1+uP_2$ using u included in a set $Z_q^*$ of positive integers less than order q and relatively prime with order q, and using two elements $P_1$ and $P_2$ included in said group.

6. An encryption and signature generation apparatus according to claim 5, wherein:

said encryption and signature generation means determines said u on said group by $u=H_1(ID)$ (ID is the public key); and when said $P_{ID}$ becomes an identity in said group, said encryption and signature generation means associates an element $P_{ID}$ of said group of order q with the public key, by calculating $P_{ID}=P_1+f(u)P_2$ (f is a function from $Z_q^*$ to $Z_q^*$).

7. An encryption and signature generation apparatus according to claim 5, wherein said encryption and signature generation means comprises:

a random number generation means, which generates a random number;

a group arithmetic means, which performs a group operation;

a hash value calculation means, which calculates a hash value;

an exclusive OR calculation means, which performs an exclusive OR operation; and a function arithmetic means, which performs a functional operation.

8. A decryption and signature verification apparatus in an ID-based signature and encryption system that comprises a private key generation apparatus according to claim 1 and an encryption and signature generation apparatus according to claim 5, with said system can use any character string as a public key, wherein:

said decryption and signature verification apparatus comprises a control and arithmetic unit, which performs at least one of decryption processing that is performed using a public parameters published by said private key generation apparatus and said client's private key issued by said private key generation apparatus, for decrypting a message encrypted by said encryption and signature generation apparatus, and signature verification processing that is performed using said public parameters and a public key of a sender, for verifying a message on which signature generation processing has been performed by said encryption and signature verification apparatus; and said control and arithmetic unit associates an element $P_{ID}$ of a group (which is selected when said public parameters are generated) of order q with the public key, by calculating $P_{ID}=P_1+uP_2$ using u included in a set $Z_q^*$ of positive integers less than order q and relatively prime with order q, and using two elements $P_1$ and $P_2$ included in said group.

9. A decryption and signature verification apparatus according to claim 8, wherein:

when said $P_{ID}$ becomes the identity in said group, said control and arithmetic unit associates an element $P_{ID}$ of said group of order q with the public key by calculating $P_{ID}=P_1+f(u)P_2$ (f is a function from $Z_q^*$ to $Z_q^*$).

* * * * *